United States Patent [19]
DuFresne

[11] Patent Number: 5,835,712
[45] Date of Patent: Nov. 10, 1998

[54] CLIENT-SERVER SYSTEM USING EMBEDDED HYPERTEXT TAGS FOR APPLICATION AND DATABASE DEVELOPMENT

[75] Inventor: Fred B. DuFresne, Sharon, Mass.

[73] Assignee: Webmate Technologies, Inc., Framingham, Mass.

[21] Appl. No.: 642,426

[22] Filed: May 3, 1996

[51] Int. Cl.[6] .................................................. G06F 13/00
[52] U.S. Cl. ............................... 395/200.33; 395/200.49; 395/769; 707/10
[58] Field of Search .......................... 395/200.3, 200.38, 395/200.55, 200.47, 186, 187.01, 603, 761, 762, 766, 769, 200.32, 200.33, 200.49; 707/9, 10, 100, 104

[56] References Cited

U.S. PATENT DOCUMENTS

| | | | |
|---|---|---|---|
| 5,355,472 | 10/1994 | Lewis ........................................ | 707/101 |
| 5,367,621 | 11/1994 | Cohen et al. ............................. | 707/501 |
| 5,455,948 | 10/1995 | Poole et al. ............................... | 707/102 |
| 5,530,852 | 6/1996 | Meske, Jr. et al. ................. | 395/200.36 |
| 5,572,643 | 11/1996 | Judson ............................... | 395/200.48 |
| 5,623,656 | 4/1997 | Lyons ......................................... | 707/10 |

FOREIGN PATENT DOCUMENTS

| | | |
|---|---|---|
| 483576 A2 | 10/1991 | European Pat. Off. . |

OTHER PUBLICATIONS

"Inserting Multimedia Objects into HTML3," http://www.w3.org/pub/WWW/TR/WD–insert–951221.html., 14 pages.

"An Instantaneous Introduction to CGI Scripts and HTML Forms," Jan. 5, 1996, 15 pages.

"A Tour of Website," http://www.Website.ora.com/book/ch03.htm, 9 pages.

"SurfCart 1.0" (Theory), Apr. 10, 1996, 3 pages.
"SurfCart 1.0" (Concept), Apr. 10, 1996, 3 pages.
StoreBuilder™, Apr. 10, 1996, 2 pages.
"Andy's Netscape HTTP Cookie Notes," http://www.illuminatus.com/cookie, Apr. 10, 1996, 5 pages.

E–mail correspondence from Jim Killian to Netscape Newsgroup, Apr. 10, 1996, 3 pages.

E–mail correspondence from Dav Amann to Netscape Newsgroup, Apr. 10, 1996, 3 pages.

Van Hoff, "Java and Internet Programming", Dr. Dobb's Journal, Aug. 1995, pp. 56, 58, 60, 61, 101–102.

Primary Examiner—Parshotam S. Lall
Assistant Examiner—Viet Vu
Attorney, Agent, or Firm—Hamilton, Brook, Smith & Reynolds, P.C.

[57] ABSTRACT

A system and methods for rapid deployment of World Wide Web applications on the Internet. A preferred method provides a template, accessible to both client and server, for constructing Web source text. The source text includes HTML tag extensions for implementing dynamic Web environment. The tag extensions are nested and grouped to form scripts to perform specific tasks, such as state construction and on-line data arrangement. Each tag extension or script is expanded and replaced with data value to be embedded within a traditional HTML tag. A processor is employed to process templates and execute tag extensions therein, and produces pages in pure HTML form for displaying by any Web browser.

28 Claims, 24 Drawing Sheets

```
exeTemplate   Name

<HTML>
<HEAD>
<TITLE> ABC Store Home Page </TITLE>
<HEAD>
<BODY>
<H1> ABC Store Web Server </H1>
Welcome <EM> ABC </EM> Customers!
<HR>
Get Information About ABC Products <BR>
By Clicking on Their Names:
<p><A HREF = "ITEM-A. html"> ITEM A </A>
<p><A HREF = "ITEM-B. html"> ITEM B </A>
<p><A HREF = "ITEM-C. html"> ITEM C </A>
<p><A HREF = "htpp://new.com/DIR/Subdir/
ITEM-D. html">ITEM D </A>
</BODY>
</HTML>
```

ADD | UPDATE | DELETE | RESET

FIG. 3A

URL

[□] —136

The Legal Beaver

Providing Customized Legal Contracts for Small Business

Welcome to the Legal Beaver

Providing Customized Legal Contracts for Small Business

The Legal Beaver concept was developed by a panel of Lawyers specializing in Business Law. From years of experience, they recognized the need Small Businesses have to be able to generate legally binding contracts quickly and at reasonable cost.

Unlike other computerized legal programs, contracts you obtain through the Legal Beaver are customized for you and ready to sign.

To begin, select the contract you by clicking on the applicable button below. You will be asked to provide specific information relavent to the contract you selected. After answering the questions a completed contract will be downloaded to your computer.

Legal Beavers, Inc.
1300 Broadway Drive
Dogwood, NC 28200
1-800-555-1212

Copyright (C) 1991, Legal Beavers, Incorporated. All rights reserved.

```
exeFooter    Name

<hr>
<center><STRONG>Legal Beavers, Inc.</STRONG>
<br>1300 Broadway Drive
<br>Dogwood, NC 28200
<br>1-800-555-1212</center>
<p>Copyright (C) 1991, Legal Beavers, Incorporated.
All rights reserved.
</BODY>
</HTML>
```

ADD | UPDATE | DELETE | RESET exeFooter | Name

```
<#page/globals/exeHeader/html>

<h1>Welcome to the Legal Beaver</h1>

<STRONG>Providing Customized Legal Contracts for Small Business
</STRONG>

<hr>The Legal Beaver concept was developed by a panel of
Lawyers specializing in Business Law.  From years of experience,
they recognized the need Small Businesses have to be able to
generate legally binding contracts quickly and at reasonable cost.

<p>Unlike other computerized legal programs, contracts you
obtain through the Legal Beaver are customized for you and
ready to sign.

<p>To begin, select the contract you by clicking on the applicable
button below.  You will be asked to provide specific information
relavent to the contract you selected.  After answering the
questions a completed contract will be downloaded to your computer.

<#page/globals/exeFooter/html>
```

| ADD | UPDATE | DELETE | RESET |

FIG. 11E

CLIENT-SERVER SYSTEM USING EMBEDDED HYPERTEXT TAGS FOR APPLICATION AND DATABASE DEVELOPMENT

BACKGROUND OF THE INVENTION

The Internet is a vast computer network, consisting of many smaller networks and individual computers that, when connected, span the entire globe.

The Internet began as a U.S. Defense Department network, ARPAnet, and later included the National Science Foundation network, NSFNET, to connect research and educational Institutions. Since the early form of the Internet was primarily supported by the government funding, commercial traffic on the network had been initially restricted. Beginning in the early 1990's, however, private, commercial networks have joined the Internet and the restrictions on commercial activity have been largely lifted. Today, the Internet connects many millions of computers world-wide and is joined by a large number of new users every day.

A protocol defines the method with which stored data are transferred from one computer to another though a network. TCP/IP (Transmission Control Protocol/Internet Protocol) is the networking protocol used primarily on the Internet. Each computer connected through a TCP/IP network is given a unique identification code and address.

The Internet, unlike a centralized network, is completely distributed. No one owns or manages the Internet other than the organization assigning the Internet Protocol (IP) numbers to identify each computer joining the Internet. An individual user may join the Internet by obtaining an account from one of many Internet service providers. An Internet account includes an IP number, and a personal computer or a private network on the account is given immediate access to millions of computers on the Internet. Because of the Internet's distributed or completely open network architecture, once a computer becomes a part of the Internet, it is possible to transfer data from one computer to any other computer of any distance apart. Although the data transfers spanning great distances are routine on the Internet, each can involve relay accesses to many other computers on the network by means of a complex routing topology.

The Internet literally holds unlimited volumes of information which are continuously accessed by its users around the globe. The exchange of information on the Internet follows the traditional network rule based on the client-server architecture. On the Internet, a server is a system running a program that manages access to stored information, and a client is a system that makes a request for certain information stored and controlled by the server. One key aspect of client-server design is that multiple clients can interact with a single server or with many different servers. An Internet server, however, typically does not have means for identifying each client with which it interacts.

The Internet has long been ridiculed for its old-fashioned access methods which are often difficult to master. A new form of interface for navigating the Internet, known as the World-Wide Web (Web or WWW), however, has revolutionized the way the information is managed and distributed through the Internet. The information servers which provide formatted documents defined by the WWW are called the Web sites. The electronic documents provided by the Web sites are commonly referred to as Web pages or files. A client software which navigates through the Internet sites and displays Web pages is referred to as the Web "browser." A browser allows access not only to Web pages, but all the other existing information resources on the Internet.

The WWW dispenses with often complex command-line utilities to search, view or transfer documents used by various other resources on the Internet. Instead, the transfer method used on the WWW is HTTP (Hypertext Transfer Protocol) which complies with the TCP/IP. The HTTP comprises a relatively simple set of messages and replies, which is primarily designed to promote flexible movement from one site to another on the Internet. The HTTP works using the standard Internet setup where a server issues the data, and a client displays or processes it. The information to be transferred on the WWW is drafted with the HTML (Hypertext Markup Language). The HTML documents are made up of standard text formatted with a special set of codes which indicate how the document should be displayed. Upon receiving a request for a Web page, a server typically returns an HTML document which is decoded and displayed on a Web browser running on the client's system.

One important aspect of an HTML document is the connectors or "hypertext links" to connect to other parts of the text or even to other documents on the same or remote servers. On a Web browser the links are part of ordinary text but are distinctively displayed. Each link is associated with a corresponding URL. Hence, a user may "jump" to other portions of the same document or to another document by selecting a link and causing the browser to transmit a request for a new Web page through the associated URL. In the WWW environment, the HTML documents very often add multimedia elements, such as graphics, sound, and video files in addition to text files. The links are easily applicable to any of these elements. The hypertext or, more properly, "hypermedia" links serve as the backbone to how WWW operates.

While the WWW does present a navigational standard that has significantly eased the user-interface to the Internet, there are inherent limitations particularly from the perspective of the information providers. For example, the WWW requires information providers to author each Webpage in the HTML format. Creating and updating HTML pages can be labor intensive, error-prone and expensive. Further, depending on the information, the content providers often find it necessary to incorporate and merge data from multiple sources into Web pages, further adding to the updating chores.

Additionally, the HTTP is a stateless, object-oriented protocol in which much of the Web transactions involve transferring a series of static HTML pages. When a Web server returns a requested Web page to the client, the link between the client and server is no longer maintained. The client may of course choose to forward a new request to the same server so as to re-establish a link. As a result, however, a critical limitation of the WWW is that the information contained in a Web page, regardless of how relevant it is to the pages following, cannot be maintained from page to page within a WWW session.

SUMMARY OF THE INVENTION

The present invention is a design, development, maintenance, and deployment systems and methods in a client-server hypertext environment, particularly World Wide Web applications and others running in an HTTP network environment. On the Internet, the methods of the present invention provide a dynamic client/server environment without the complexities associated with CGI programming, and significantly removes the laborious task of updating Web pages on the WWW. In a preferred embodiment, the present invention provides a framework for rapidly deploying new applications based on HTTP protocol with security and remote access capabilities to all elements of each application.

In a preferred embodiment, the method of deploying client-server applications involves inserting executable tags in an HTML source to a displayable page. These executable tags refer to HTML "tag extensions" defined by the present invention where each tag identifies, from a database, a field name having a value such that executing the tags replaces each tag with the corresponding value. In the preferred embodiment, a Web server, in response to a request for the Web page from a client, processes such a source by executing the tag extensions to expand.

Preferably, a source defined by the present invention embeds the tag extensions within HTML tags, such that when the extensions are processed and replaced by the corresponding values, the source is left only with HTML tags with static values as arguments therein which a browser can read and interpret In a preferred embodiment, a tag extension is often directed to a field name corresponding to a static value, such as a number or text. A tag extension can, however, be directed to a field name which corresponds to a value representing another tag extension or a URL (Uniform Resource Locator). A value, therefore, has a dynamic property. A full execution of a tag extension requires exhaustively expanding all related values or commands until a value is static and can no longer be expanded.

In a preferred embodiment, the present invention provides a processor which interfaces with an HTTP server to execute tag extensions. The present invention further provides instructions which are a type of tag extensions. The instructions cause the processor to perform predefined functions. The instructions include a control-loop function to collect data from a group of data sources in a predefined manner. Such function generates data sets which are collections of data for use in a particular application. As mentioned, a tag extension in a source to a Web page is associated with a value in a database. Such a value can be static data or a variable, such as another tag extension. A value can also be an instruction or a group of instructions.

In a preferred embodiment, the instructions can be nested and grouped to form a script which performs predefined tasks, such as mathematical computations or complex data arrangements. Preferably, a script is embedded in a tag extension such that executing the extension causes the script to expand and further execute other tag extensions or instructions defined by the script. Similarly, in a hypertext source of the present invention, a value associated with a tag extension can be a script such that processing the source executes the tag extension and further causes the script to expand and execute a string of tags and instructions. Upon exhaustion of the extensions and/or instructions, the resulting static value replaces the original tag extension in the source.

The present invention can provide one or more databases controlled by the processor for storing the data values. In a preferred embodiment, each value is identified by a field name and is stored as a field name/value pair in a database.

The present invention further includes templates as a platform for implementing client-server transactions. In a preferred embodiment, a template is a hypertext form which includes a text area for entering source text such that the source can be edited and updated by accessing the template through any browser. Alternatively, the source can be inserted into a template through an electronic mail transfer. Each template further includes input fields for entering access control lists for specifying authorized users to read, write or execute the source in the template. Each template also includes an identification field for entering the template name. In a preferred embodiment, the templates are stored in a template database. The field names and corresponding contents of a template are stored in a content database. Both the template and content databases are controlled by the server of the present invention. Preferably, sources to all Web pages controlled by the processor of the present invention are constructed using templates. As previously mentioned, a source contains HTML tags and tag extensions of the present invention. The extensions are directed to field names and corresponding field values. These values can be static but more often, they are variables, such as instructions, other tag extensions, URL's, or scripts. The values further can point to other templates.

A preferred method of implementing a client-server application, therefore begins with preparing a source template to a displayable page for processing by a server having a processor of the present invention. The template comprises a text area for entering a source code which includes hypertext codes embedded with tag extensions executable by the processor. Each tag specifies, in a data record, a field name having a value such that executing the tag extensions replaces each tag with the corresponding value. The template further includes an identification field for entering a template identification and an input field for entering an access control list to specify authorized users of the template.

A template prepared as above is retrieved for processing by the processor when a client makes a request for the corresponding displayable page. The source code defined within the template is then processed by the processor. Such process includes executing the tag extensions in the source to replace each extension with the corresponding value so as to configure the page with the remaining hypertext codes. The resulting source to the displayable page is, therefore, a pure HTML document which can be interpreted by the client browser.

Another aspect of the present invention relates to a method of controlling user access to a record in a database defined by the present invention. A preferred method begins with processing an access request from a client to a protected record in a database where the record includes an access control list to specify authorized user identifications. Such a request is redirected to a verification directory which causes the server to issue an input query to the client to input a user identification and password. The verification directory provides a profile listing of user identifications and matching passwords. The user identification and password from the client are verified against the profile listing, and upon a proper verification, are given a pass to enter the database. The user is then further verified against the access control list to determine whether the client has a valid access to the record.

Another aspect of the invention relates to a method of implementing a state environment within a HTTP client-server session. A "stateful" Web transaction allows a Web server to retain and pass a series of information exchanges between the client and server to the client through each displayable page so that any any inputs made by the user are maintained throughout the session. A preferred method begins by receiving user inputs in a hypertext form from a client in a session. The form further provides a state variable and a call button to a script run by the server. When the user transmits the input selections by pressing the call button, the server processes the script and generates a new state based on the old state, inputs and script. The new state is then embedded into a subsequent form passed to the client through a known protocol or in a hidden field.

The above and other features of the invention including various novel details of construction and combination of parts will now be more particularly described with reference to the accompanying drawings and pointed out in the claims. It will be understood that the particular devices and methods embodying the invention is shown by way of illustration only and not as limitations of the invention. The principles and features of this invention may be employed in varied and numerous embodiments without departing from the scope of the invention.

BRIEF DESCRIPTION OF THE DRAWINGS

FIG. 3A and 3B describe the HTML source codes and how they are interpreted for display on a Web browser.

FIGS. 11A through 11E describe a preferred method of constructing a globals template.

DETAILED DESCRIPTION OF THE INVENTION

Figure 1:
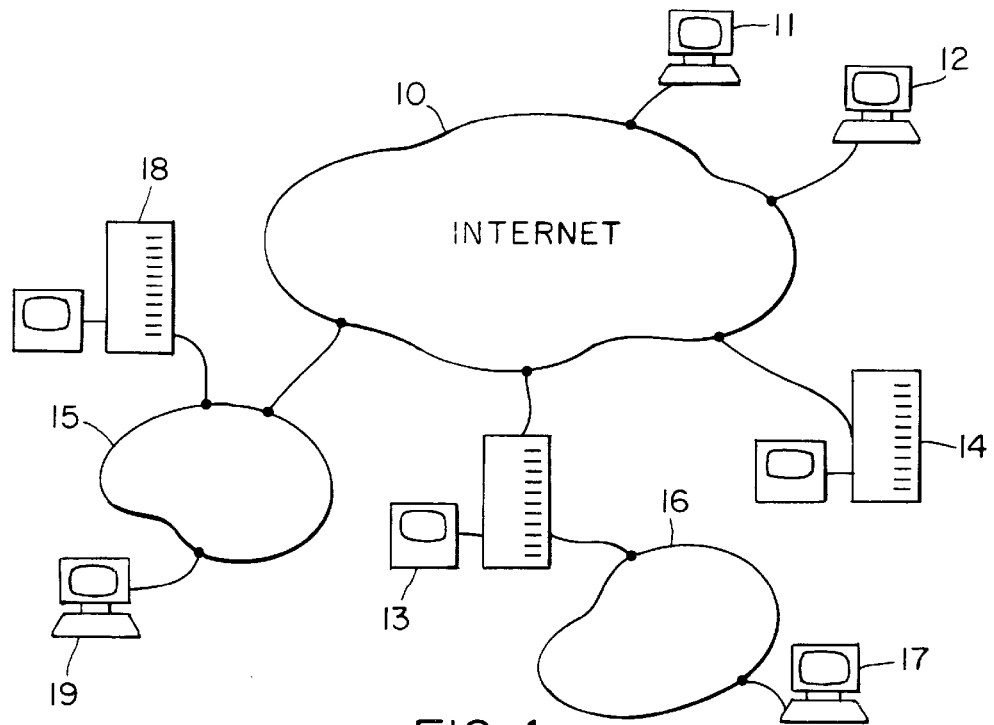
FIG. 1 is a graphical illustration of the Internet environment.

The preferred embodiments of the invention herein are generally described within the Internet context as a typical HTTP environment. The methods and systems of the present invention are, however, equally applicable to an intranet or other networks based on HTTP. Referring now to the figures, FIG. 1 is a graphical illustration of the Internet 10. The Internet is a network of millions of computers and other local networks. The computers on the Internet are largely classified as either servers 13, 14, 18, or clients 11, 12, 17, 19. Typically, the Internet servers 13, 18, are part of smaller networks 15, 16. Similarly, many clients 17, 19 are part of local area networks 15, 16, but, today, great many others are personal computers connected on the Internet as stand-alone members.

As previously discussed, the clients make requests through the Internet for information which are stored in the systems controlled by the servers. The term "server" often refers to both the system and the software that manages the system. Of particular interest among the various types of Internet servers and clients are Web servers which provide information formatted with the HTML codes, and Web clients, such as Web browsers, which interpret HTML documents for display. The HTML provides rules for displaying ordinary text and graphics, and means for specifying connectors to allow users to traverse through the Internet to other files held by other Web servers.

Figure 2:
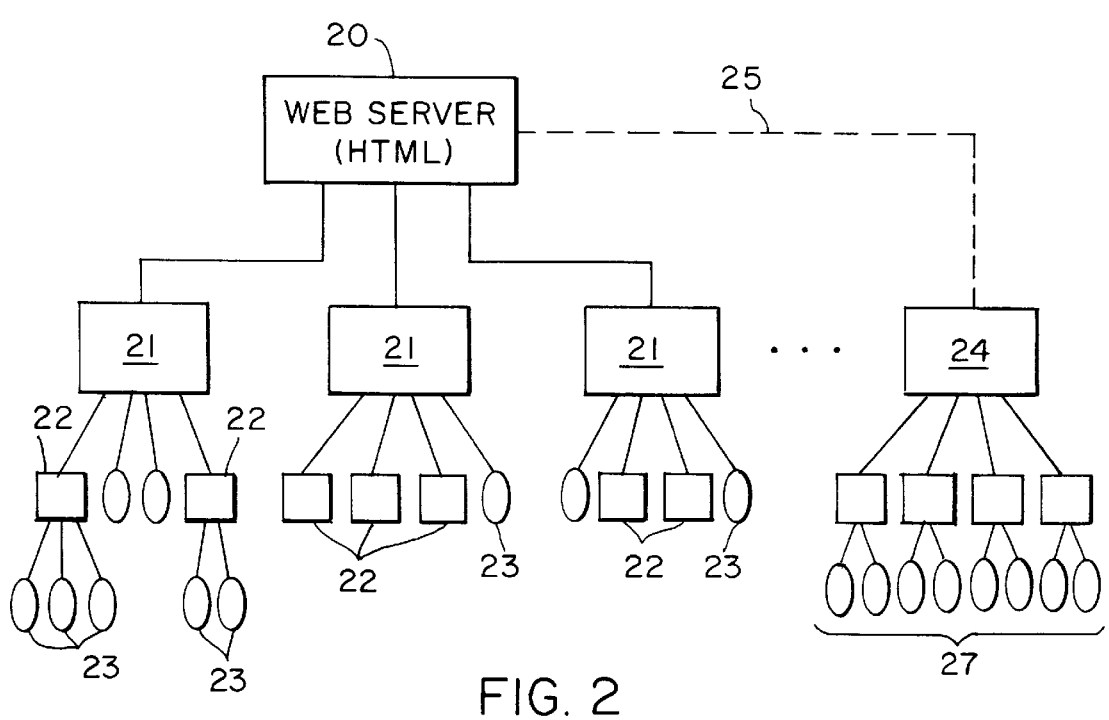
FIG. 2 illustrates the directory structure of a Web server.

FIG. 2 illustrates the manner in which a Web server 20 manages information stored under its control. The Web server 20 refers to a machine on the Internet which runs a program to manage HTML files 23 which may be located locally or at a remote site. The files 23 are stored in a tree structure in directories 21 and subdirectories 22. The server 20 may also support a remote directory 24 through a local network link 25. When a client makes a request for a particular Web page controlled by the Web server 20, the server processes the request by locating the source page from a directory 21 or a subdirectory 22, and returns the page to the client for display. As previously described, the HTML performs two main tasks: defining hypertext links, and describing the document format with which the client browser interprets the source pages transmitted by the content servers. Formatting is defined in rather general often relative terms in order to maintain general compatibility with clients using a variety of Web browsers.

Figure 3B:
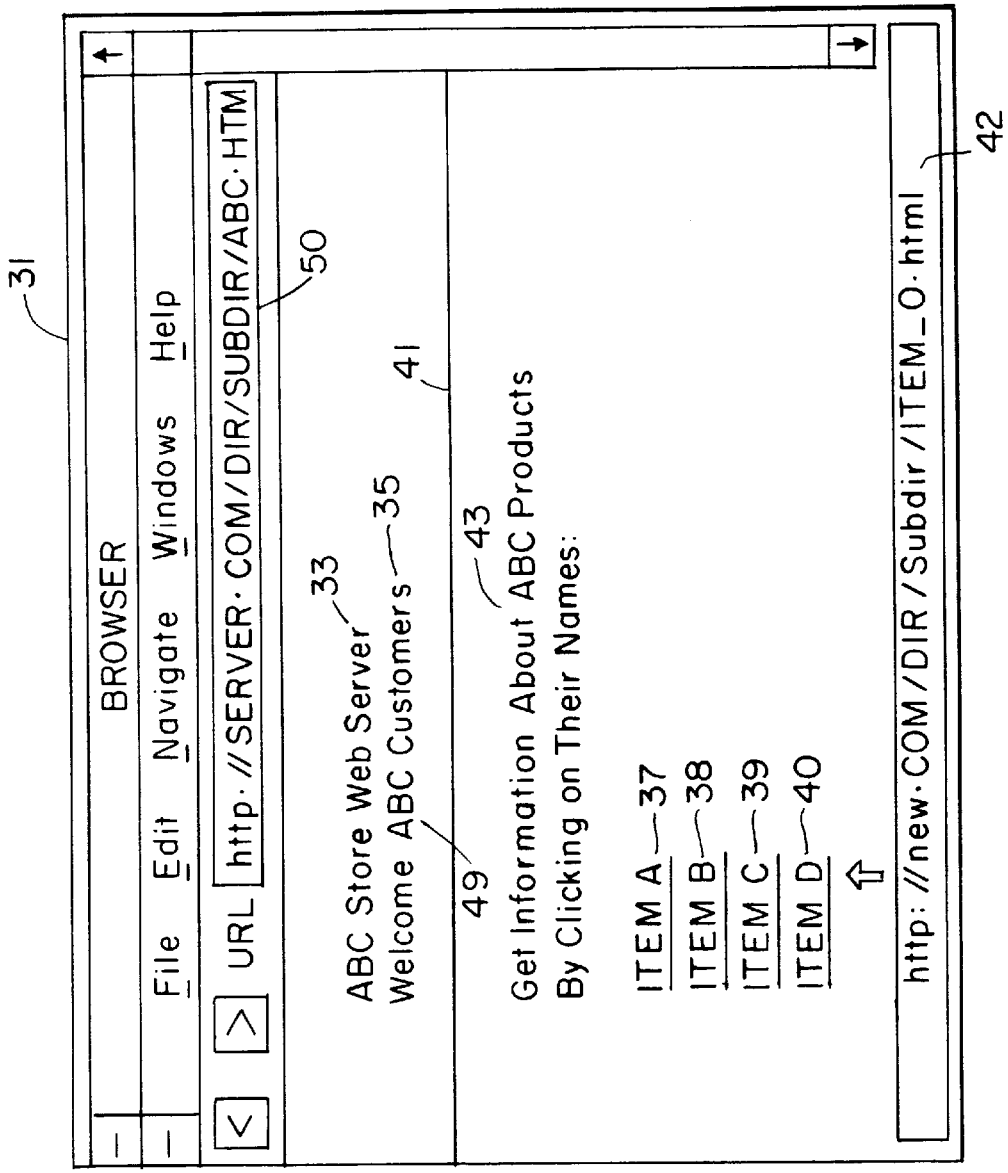

FIG. 3A and 3B illustrate a sample HTML source page and the corresponding page as displayed by a Web browser on a client system. The most basic element in an HTML document is a tag, which is enclosed by the angle brackets, "<" and ">". The HTML tags typically are used in pairs to wrap text, much like the quotation marks, with one tag 33 starting the action and the other tag 34 ending it. The ending tags look just like the starting tags except for a slash mark preceding the tag name within the brackets, as in the following syntax:

<tag>text</tag>

As illustrated in FIG. 3A and 3B, tags are used to format the text by type and attribute for displaying the page in a certain manner, and constructing links to other files. For display formatting, the HTML includes identifier tags. The identifier tags define a portion of the text as the title of the document 33, 34, another portion as the document headers 44, 45, another portion as the document body 46, 47, etc. The HTML also includes tags to break paragraphs 36 and sentences 48 and horizontal rules 41 to separate portions of the text in a page. Text attributes 49, such as <EM> for "emphasis," provide emphasis to words in a Web page in different ways. HTML also provides list and glossary tags. Lists are simply paragraphs, sentences, phrases or single words presented in an itemized format. There are several kinds of lists. The most commonly used ones are ordered lists and unordered lists. Glossaries have a structure in which each item is a term followed by a definition. The terms are usually short items, while the definitions can be several paragraphs in length. Both glossaries and lists can be nested.

An important aspect of the HTML is creating hypertext links to connect one Web page to another. Like the formatting mechanism, the hypertext links are also created using tags. The tags for constructing links are appended with attributes. Attributes in a tag define exactly how the action will work. The syntax for using a hypertext tag with an attribute is generally as follows:

<tag attribute="value">hypertext</tag>

The tag for setting up a hypertext link is "<A>" and the attribute is "HREF". An "HREF" is a code for directing the browser to a certain file specified by the "value" string above. The tag is followed by a text and an end tag "</A>". The text is typically highlighted and underlined when shown on a browser to tell the user that it is a hypertext. In FIG. 3A, in the sample HTML source document 30, note that there are four hypertext links 37, 38, 39, 40, specified as ITEMS A to D. Taking ITEM D as an example, the syntax used is:

<A HREF="http://New.com/Dir/Subdir/ITEM-D.html">ITEM D</A>

Note that the value given to the HREF attribute is a full directory path, or a URL (Uniform Resource Locator) locating the file associated with the hypertext, "ITEM D". Here, "http" indicates the file transfer protocol, "New.com" is the server name, "Dir" is a directory controlled by New.com, "subdir" is a subdirectory which stores the HTML file, "ITEM-D.html". In some situations, such as ITEMs A, B and C, where a linked page resides within the same server, only the document name need be specified without the full server/directory path.

FIG. 3B illustrates a source page 30 in FIG. 3A being displayed by a Web browser. The browser reads and translates the HTML codes from the source page 31 and displays the processed page 30 on the client system. A typical browser includes guide features, such as the URL field 50 to indicate the source address of the current page, and the status bar 42 to indicate the URL of a pointed hypertext link 40. The remaining portion of the screen shows the contents of the source code 30, which include the title 33, the header 35, and the hypertext links 37, 38, 39, 40, which are shown as underlined. Typically, the linked items are highlighted with different colors as well as underlined to show their distinction. Other display items include a horizontal rule 41 for separating text, and an emphasized text 49 which is larger and bolder relative to the remaining text in the same sentence.

Web browsers can receive as well as send information through HTML forms transmitted by Internet servers. HTML forms provide input fields in which a user enters appropriate information through a Web browser. When user inputs are collected on a Web form page, the browser forwards the input values to a Web server specified by the form. Upon receiving the form, the server starts a program to process the information transmitted. Such programs are known as the "common gateway interface" programs, or the "CGI scripts".

The CGI is a standard for interfacing external applications with content servers, such as Web servers. A non-form-based HTML document that a Web browser displays is static. A CGI script, on the other hand, is executed in real time to output dynamic information which is put into displayed on a Web page. A CGI script is executed when a user activates an HTTP URL that is directed to a file containing a CGI program or script rather than an HTML document.

Figure 4:
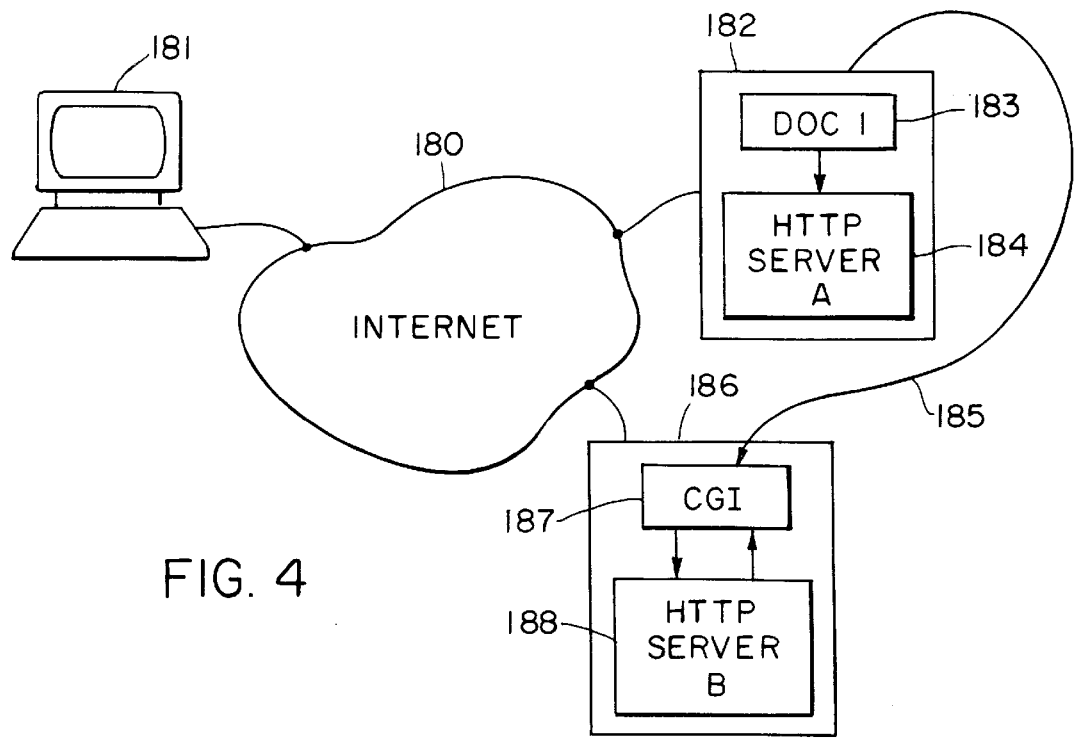
FIG. 4 generally describes how a CGI program operates when activated by a hypertext link.

FIG. 4 is a simplified model illustrating how a CGI program works. Client 181 requests and receives an HTML document 183, "Doc1.html," from Server A 184 of Computer A 182. Doc1.html contains a link 185 to a file in Computer B 186 controlled by Server B 188. The link 185 is directed to a CGI program which can be executed if the user from Client 181 activates the link. The link is a normal HTTP link, but the file is stored in such a way that the HTTP server on Server B can determine that the file contains a program that is to be run, rather than a document that is to be sent to the client as usual. When the user selects the link the CGI program 187 is executed to prepare an HTML document on the fly, and sends that document to Client 181, which displays the document as it would any other HTML documents.

The ability to process fill-out forms within the Web environment required modifications to HTML, Web clients, and Web servers (and eventually to HTTP, as well). A set of tags was added to HTML to direct a Web client to display a form to be filled out by a user and then forward the collected data to an HTTP server specified in the form. Servers were modified so that they could then start the CGI program specified in the form and pass the collected data to that program, which could, in turn, prepare a response (possibly by consulting a pre-existing database) and return a Web document to the user.

Figure 5:
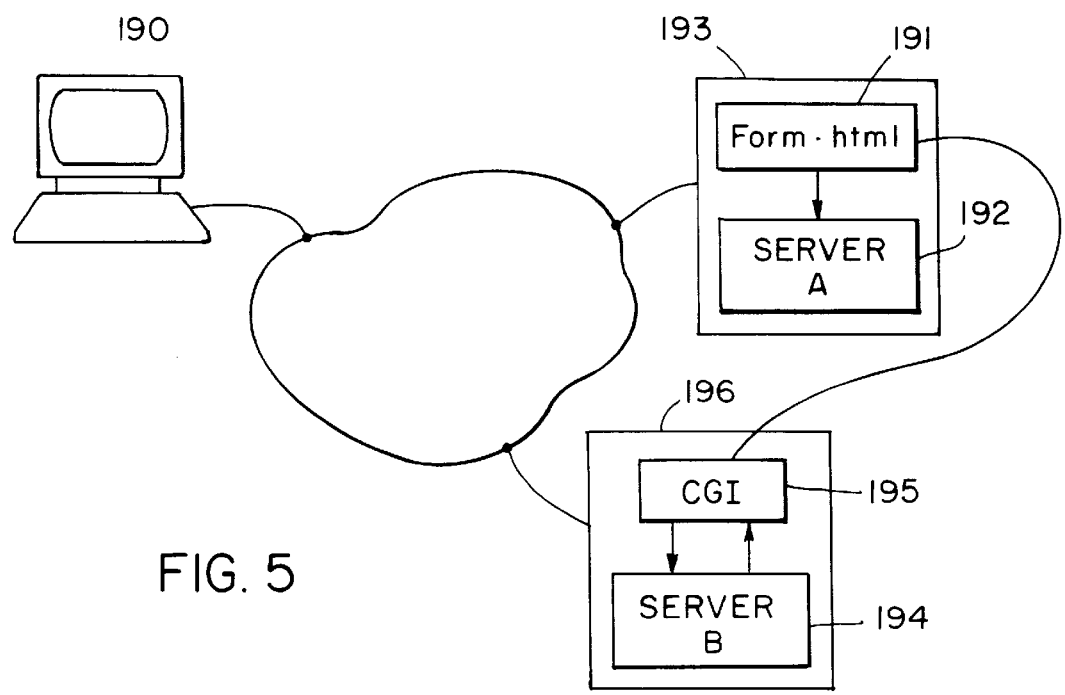
FIG. 5 describes how an HTML form relates to a CGI program running on an HTTP server.

FIG. 5 shows the various components of the CGI process. In FIG. 5, the Web client 190 acquires a form from Server A 192 running on Computer A 193. The client 190 displays the form, the user enters data thereon, and the client sends the entered data to the HTTP server 194, Server B, running on Computer B 196. There, the data is handed off to a CGI program 195 which prepares an HTML document and sends it to the client 190 for display.

CGI scripts, however, are complex and difficult to program. Each script requires customization to implement a particular Web application in a particular way. CGI scripts, therefore, lack standardization and adaptability from one application to another, and content providers running Web servers are often faced with writing multiple CGI scripts to accommodate a variety of HTML forms carried by different Web applications.

The present invention provides improved methods for deploying and maintaining World Wide Web applications. In a preferred embodiment, the present invention provides dynamic Web environment without the complexities associated with the CGI programming, and significantly removes the laborious task of updating Web pages on the WWW. In a preferred embodiment, the present invention provides methods for passing information from one Web page to another within a Web session. Such methods overcome limitations of the Internet browsing in which each Web page is unrelated to the others.

General Framework of the Invention

In a preferred embodiment, the server system of the present invention implements a basic set of components which includes templates, HTML tag extensions, and a structured database system. A template is an HTML form to define contents of a display Web page requested by a client. It is through the use of templates, the server system of the present invention communicates with clients and its own databases. A template includes HTML tags and tag extensions to define and build a Web page. In a preferred embodiment, the extensions are executable codes embedded within conventional HTML tags as arguments. When executed, such a tag extension is replaced with a value to yield a displayable HTML tag. The preferred system of the present invention defines a unique database structure to index data values for retrieval by the server.

Figure 6:
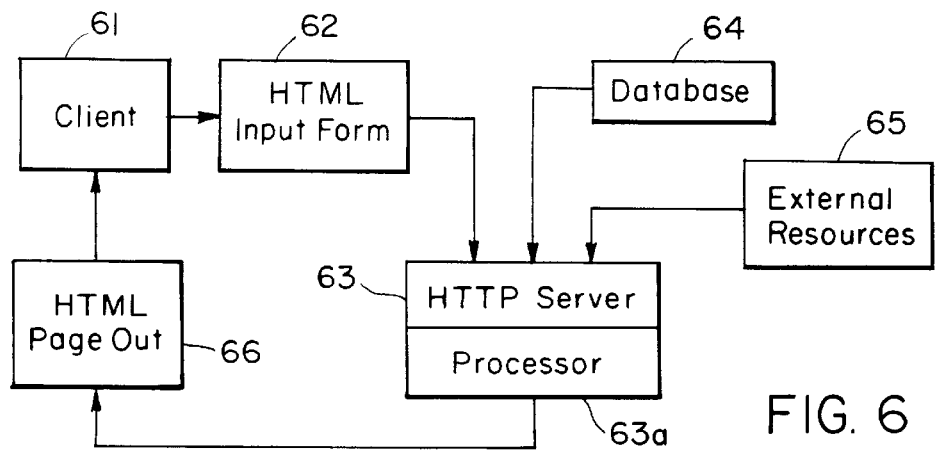
FIG. 6 illustrates a preferred embodiment of the operation principle of the present invention.

FIG. 6 illustrates the general framework of the present invention and how it operates through the Internet. An Internet transaction typically involves a Web client 61, an HTTP server in 63 and a storage 64 for storing content source. FIG. 6, shows a traditional HTTP server 63 controlled by a preferred processor 63a of the present invention. In response to service requests from a client 61, the processor prepares a Web page for display at the client browser. Unlike the traditional HTTP process, in which a Web server merely serves up a static Web page from a storage directory, the processor 63a constructs a Web page by incorporating database records on the fly.

The present invention includes a main/local database 64 which stores a set of data elements that are particularly defined and indexed by the processor 63a. The data elements include program parameters as well as structured data records. The processor 63a of the present invention can further access data from external sources 65.

In a preferred process, each service request by the client 61 invokes a template 62 containing both static HTML and executable codes in an input field. Additionally, each template in a preferred form provides identification and access control fields to identify and secure itself. The template 62 also includes "scripts" to perform various functions. The template is processed by the processor 63a and each code is replaced by a stored data value or executed to perform certain task. This process produces an output HTML page 66 which is displayable on the client browser. For certain client requests, the processor 63a can additionally retrieve data from external resources 65.

Figure 7:
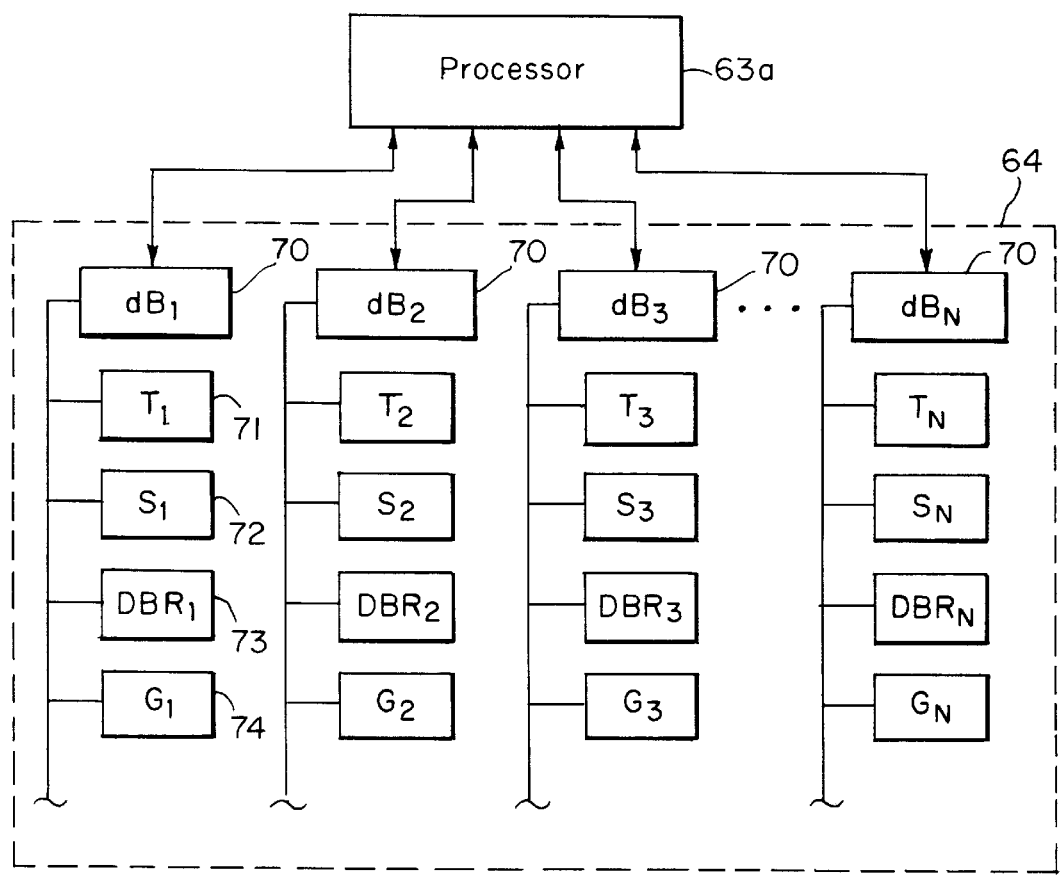
FIG. 7 illustrates a preferred structure of the application databases controlled by the server system of the present invention.

In FIG. 7, it can be seen that the database 64 of FIG. 6 generally comprises one or more application databases 70, "$dB_1$" thru "$dB_N$." Each of the application databases represents a Web application managed by an Internet server. In a preferred embodiment, each application database 70 includes a plurality of elements, such as "TEMPLATES" 71, "SCRIPTS" 72, "DATABASE RECORDS" 73, and "GLOBALS" 74. Data in each element is accessed through a template and processed by the processor 63a to construct an output Web page requested by the client.

Templates/Database Structure

Figure 8:
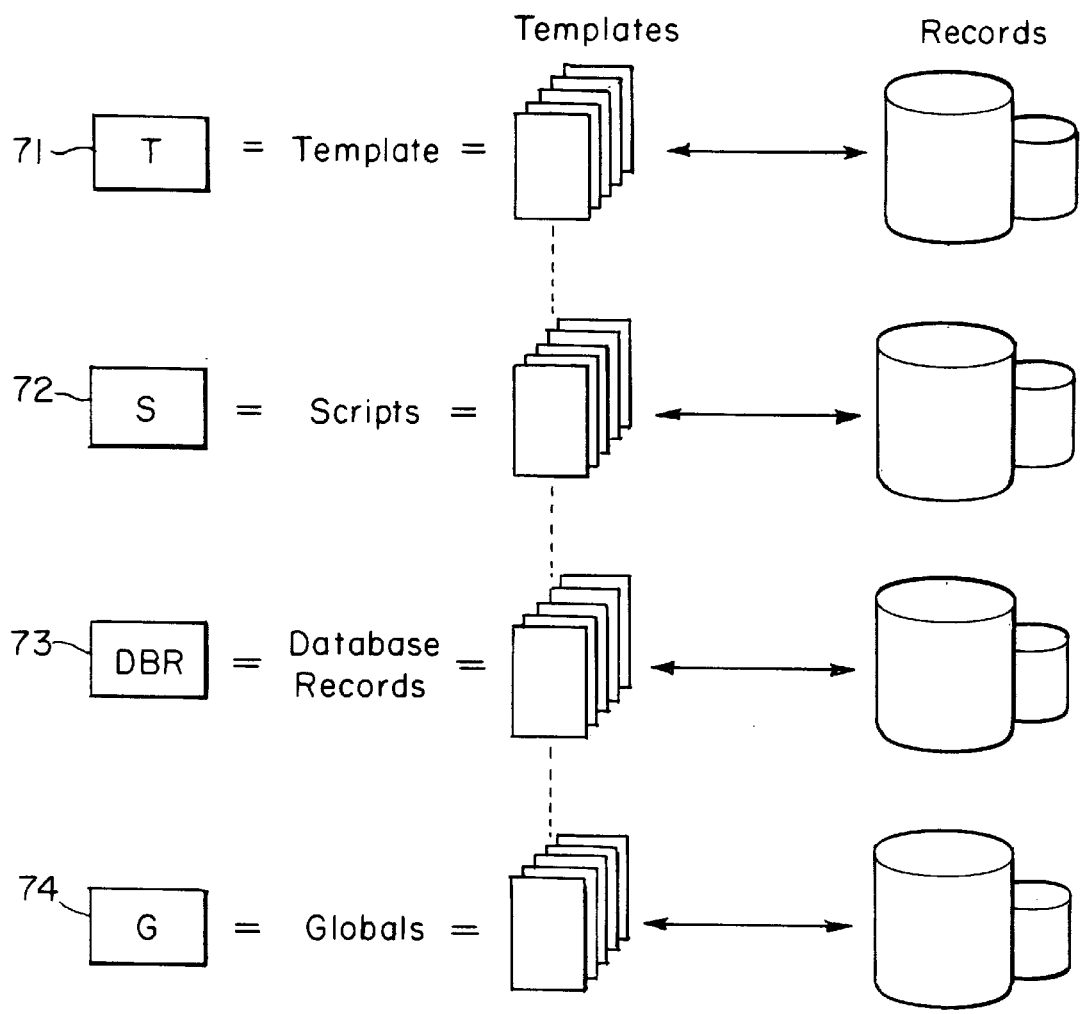
FIG. 8 illustrates a preferred structure for indexing the elements of an application database controlled by the methods of the present invention.

FIG. 8 illustrates the template/database pair for each element. In a preferred embodiment, each template specifies what information from the database a corresponding output Web page should contain and how the page should look. FIG. 9A illustrates the preferred structure of a blank template form 90. Each item in a template, such as the ID field 91 and access control fields 92 and 93, is stored as a field name/value pair in a database. A "field" is the name of an item in a template and the "value" is the corresponding data record held by that field.

Figure 9B:
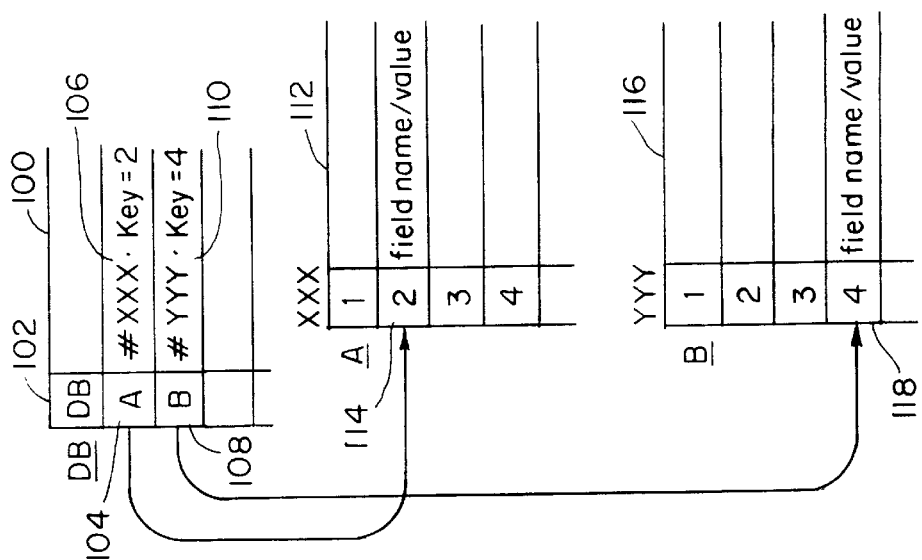
FIGS. 9A and 9B describe a preferred structure of a template and the corresponding database structure.
Figure 9A:
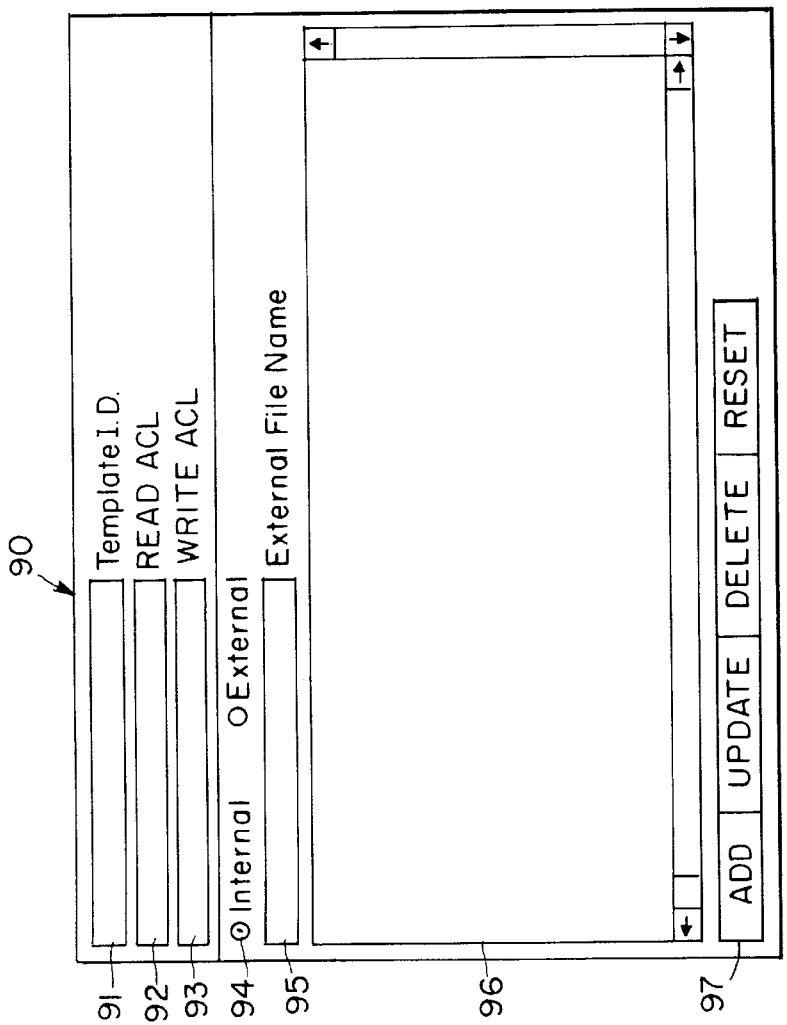

A preferred database structure is shown in FIG. 9B. Each database is represented by a table 100, 112, or 116 which includes a column 102 for identifying sub-tables, such as 104, 108 of the master table 100 (i.e., database of databases). Each row in a table provides a string of data, i.e. "field name/value", in the field name/value pair format, including a pointer pair 106, such as "key/value" pair, which identifies the row in the corresponding sub-table. For example, in the master table 100, the row "A" 104 contains a key/value pair "#xxx.key=1" 106. The key value "1" thus represents a row in the sub-table A 112. Similarly, in the row represented as "B" of the master table 100, the key value is identified as 4 (i.e., #yyy.key=4). Thus, in a sub-table B 116, corresponding to row B of the master 100, a row identified as "4" is located.

Referring back to FIG. 9A, each preferred template is uniquely identifiable through the "template ID" field 91 specified by a user or a system manager. Preferably, each template is protected by the "access control lists" (ACL's) 92, 93 to limit access to specified group of authorized users. The access restriction can also be applied to ranges of dates or to a location. The "internal/external" selection field 94 indicates whether or not the template will be under the control of a local server. In the event the template is controlled by an external server, an external path is required in the field 95 to store the output Web page created by the present template. The "text area" field 96 provides the input area in which authorized user can insert HTML source and codes defined by the present invention. In the preferred embodiment, the action mode buttons 97 triggers the processor 63a (see FIG. 6) to store the information on template to a database. For example, if the contents of a template is new, then selecting the "ADD" button will add the new information to the database. Also, bringing up an existing template and adding it to a new template ID is a convenient way of copying a template for multiple use. If a template has been modified, selecting "UPDATE" will implement revisions to the present template. Selecting "DELETE" will remove the template from the database. Selecting "RESET" will undo all the changes which took place during the current editing session.

As previously indicated, a template is a means with which a server/processor 63a (see FIG. 6) of the present invention communicates with a client. It is important to note that a template is an HTML form and accessible to both the server and client. Thus, an authorized user (as identified in each template) can remotely access a template using any client browser to add or modify data. Similarly data can be transferred into a template through electronic mail using convention mail protocol.

Figure 10A:
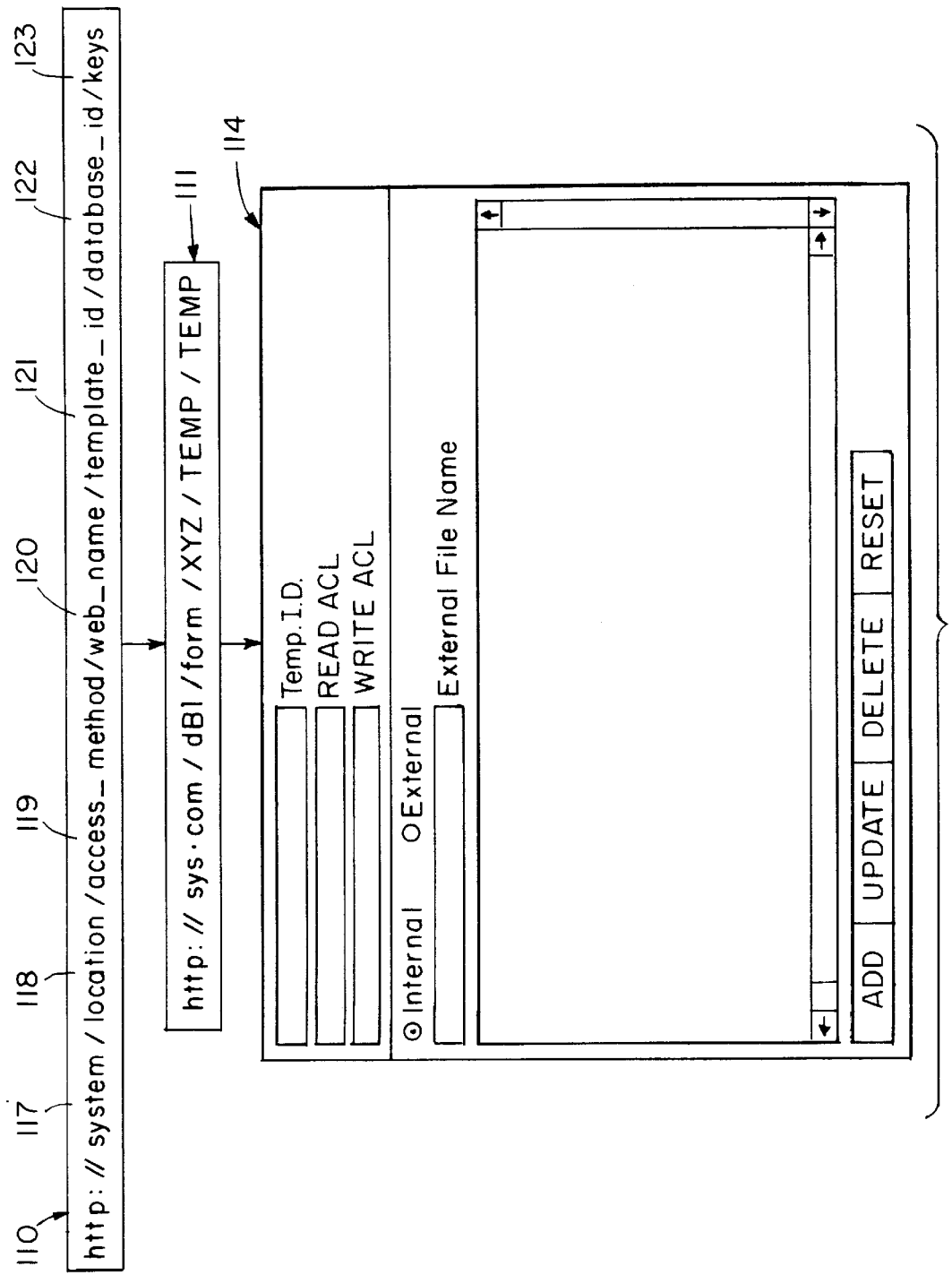
FIGS. 10A through 10C describe a preferred method of constructing and editing a template and the associated URL syntax.
Figure 10B:
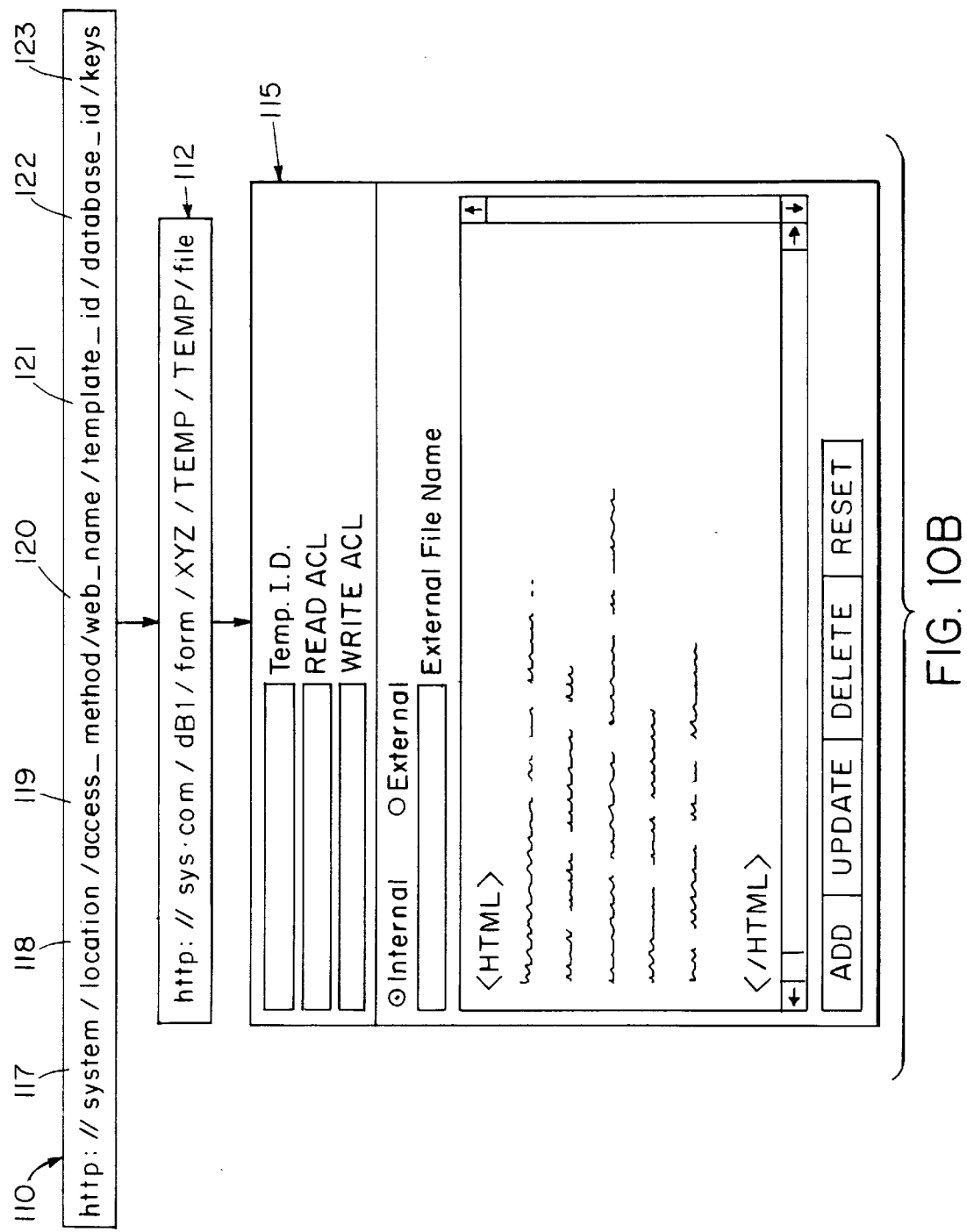
Figure 10C:
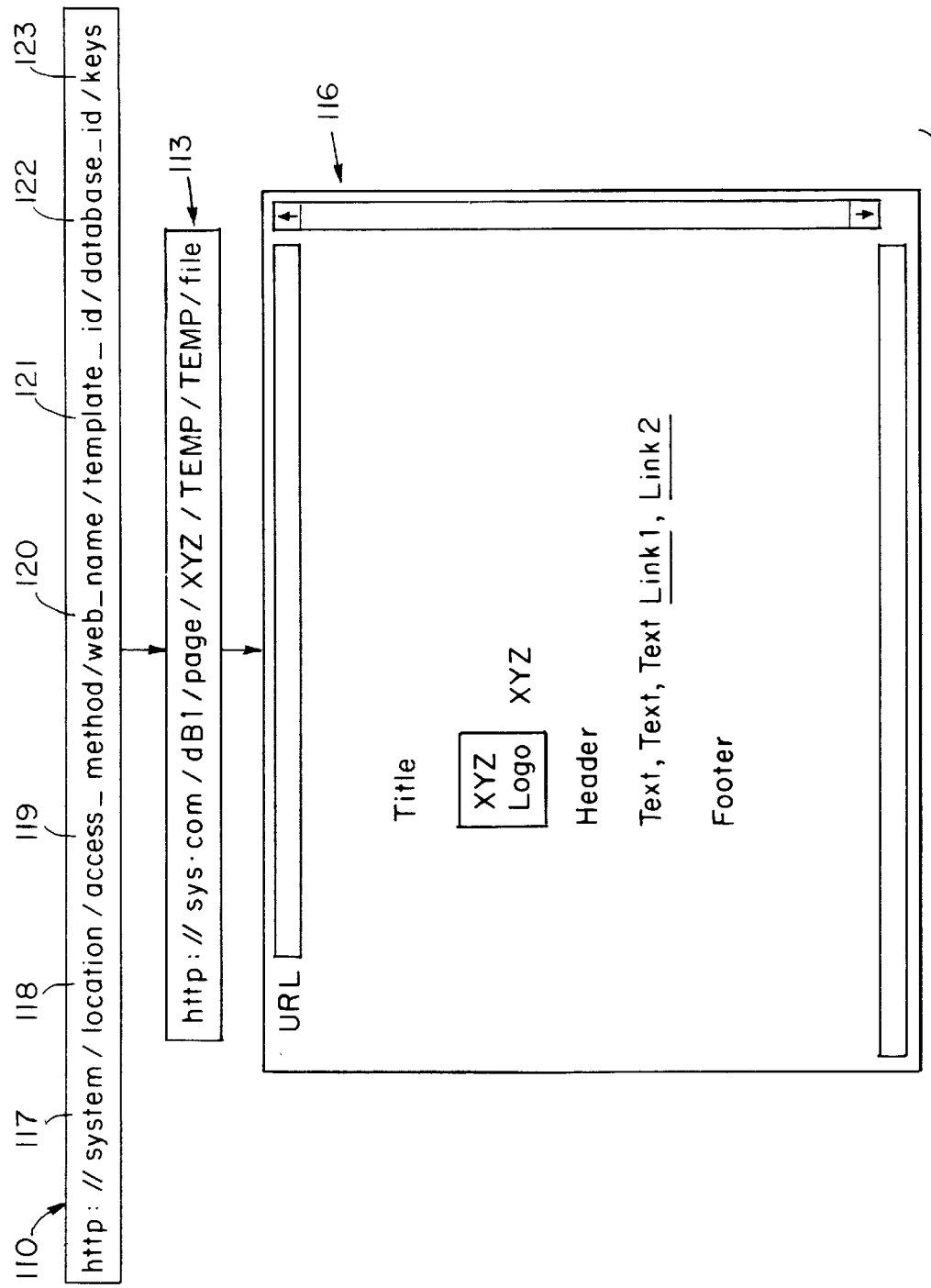

In a preferred embodiment, any direct calls or hypertext links to a template or HTML pages of the present invention invoke URLs that are particularly defined to instruct the server/processor in implementing the present invention. FIGS. 10A to 10C illustrate a preferred URL syntax for invoking a template and the corresponding Web page in various modes. The full syntax 110 takes the standard URL form which includes the system name 117 and the directory path 118 of the template/database pair. The "access method" 119 refers to the type of Web transaction. For example, a preferred mode for calling a template is "form," and an HTML page (i.e., an output page resulting from the process) is called by "page." "Web name" 120 is a pre-designated name for the Web site or the server location providing the information requested. The "template ID" 121 and "database ID" 122 refer to the template/database pair. "Keys" 123 refers to a key value directed to a specific data record in the database as identified in the preceding terms of the URL. For the example shown in FIGS. 10A to 10C, the following names are used:

system=sys.com
location=dB1
access method=form
web name=XYZ
template id=TEMP database id=TEMP
keys=file In a preferred embodiment, under the URL syntax 110 as given in FIG. 10A, a template may be invoked in three different ways. To bring up a blank template on a browser, the basic URL 110 is invoked without specifying "keys" 123:

http://sys.com/dB1/form/XYZ/TEMP/TEMP

FIG. 10B shows the resulting blank template 114. To retrieve an existing template for modification, a full URL 112, as shown in FIG. 10B, is specified:

http://sys.com/dB1/form/XYZ/TEMP/TEMP/file

Typically, an existing template having content is protected and accessible only to a content provider to make changes or updates by using an access field in the updates discussed below. In ordinary client-server transactions, invoking templates is transparent to users. A user merely points to a link and the client-browser in turn merely requests a Web page which it can display. This request takes the URL 113 as recited below:

http://sys.com/dB1/page/XYZ/file

The URL 113 causes the processor 63a (see FIG. 6) to retrieve and execute the template (i.e., the template 115 shown in FIG. 10B) associated with the key value "file." In this case, however, the processor recognizes from the "page" designation in the URL that the client is requesting only the Web page. Accordingly, the processor extracts the HTML data from the text area of the template as the hypertext source. That source is executed, resulting in an output HTML page 116 as shown in FIG. 10C.

From the above, it can be seen that even though hypertext sources are presented in text area of templates, the sources can be retrieved through a client browser using "page" URLs with the surrounding template being transparent to the client browser. On the other hand, a source can be retrieved as revisable text within a template by the "form" URL and by meeting appropriate access requirements. Those access requirements are included in a field of the same template that carries the source text as discussed below.

FIG. 10A through 10C demonstrates a preferred template usage of the present invention, which is to construct an HTML source to an output Web page in response to a client request. Additionally, the templates are a platform for constructing a variety of application elements and collecting information. They are used to define reusable formatting tags, to create scripts (e.g., subroutines) and special user data sets. For each of these tasks, the present invention provides templates and associated databases as described below.

HTML Tag Extensions and Instruction Sets

An important aspect of the present invention is HTML tag extensions which allow dynamic Web page processing and "stateful" Web sessions. In a preferred embodiment, the tag extensions are a set of HTML-like tags that extend the functionality of HTML. The tag extensions operate as variables, which, upon processing by the server of the present invention, become replaced by the associated values. The preferred extension syntax is similar to an HTML tag in that both are enclosed in angle brackets "<>". The preferred extensions of the present invention are distinguished by preceding each extension with a pound sign "#" inside the brackets. Similar to the HTML tags, the extensions may also have one or more modifiers. A preferred tag extension has the following syntax:

<#tag modifier1 modifier2>

Since a tag extension results in a substitution of some kind, it does not require an end tag, such as </tag> of the conventional HTML.

A preferred form of tag extensions include the following: The "<#page>" tag, when processed, is replaced by contents of a database field which is specified following the tag. For example:

<#page/database/file_name/html> where,
page: represents a current URL: system/location/form/Web name.
/database: is the name of a database.
/file_name: is the name of the file in the database.
/html: is the name of the data field.
Therefore, a tag extension <#page/globals/xyzHeader/html> would result in the data value given in the html field (i.e., the text area of the globals template) for the file "xyzheader" in the "globals" database to be substituted in place of the <#page/...> tag.

The "<#URLBASE>" tag is used for constructing generic hyperlink URLs. The <#URLBASE> tag gets replaced with the system and location information local to the source. Assuming the following server information:
system=kbt.com
location=one Web
access method=form
Web name=spider
The <#URLBASE> tag would return: kbt.com/one_Web.

The "<#Web>" tag complements the <#URLBASE> tag in constructing generic hyperlink URLs. The <#Web> tag is replaced with a Web site name of the source. Therefore, using the above example, the <#Web> tag would be replaced by: "spider." Using the last two tag extensions above, a generic hyperlink to a template called "calc_xy" can be constructed, without knowing the directory structure of the source, as follows:

<#URLBASE>/form/<#Web>/calc_xy

When processed, the above expression results in the following path in a URL:

kbt.com/one_Web/form/spider/calc_xy

Note that the two tags are simply replaced with the appropriate substitutions. The advantage is that a source path of a URL need not be predefined, and that the code can be used on any system without customization. It follows that a hypertext link can be constructed with a set of tag extensions of the present invention as follows:

<A HREF="<#URLBASE>form/<#Web>/calc_xy">...text...</A>

In a preferred embodiment, the "instructions" are commands which can be used in the same manner as the tag extensions are used. Similar to a tag extension, each preferred instruction is preceded by a pound sign "#" inside a pair of angle brackets. The instructions provide commands to perform tasks which include reading and writing records and record definitions, creating controlled loops to collect data, and printing messages.

Globals

The preceding described the general framework of the present invention which includes the client-server communication methods involving templates and executable tags and instructions. The methods of the present invention further includes application elements, such as "globals". Globals are a packaged source code that can exist on multiple Web pages, such as a header, footer or a design or a logo common to Web pages of a single company. A preferred global includes a collection of sources of text and graphics formatted in HTML and with tag extensions. Globals are defined through the use of templates and the associated records in a database.

Figure 11A:
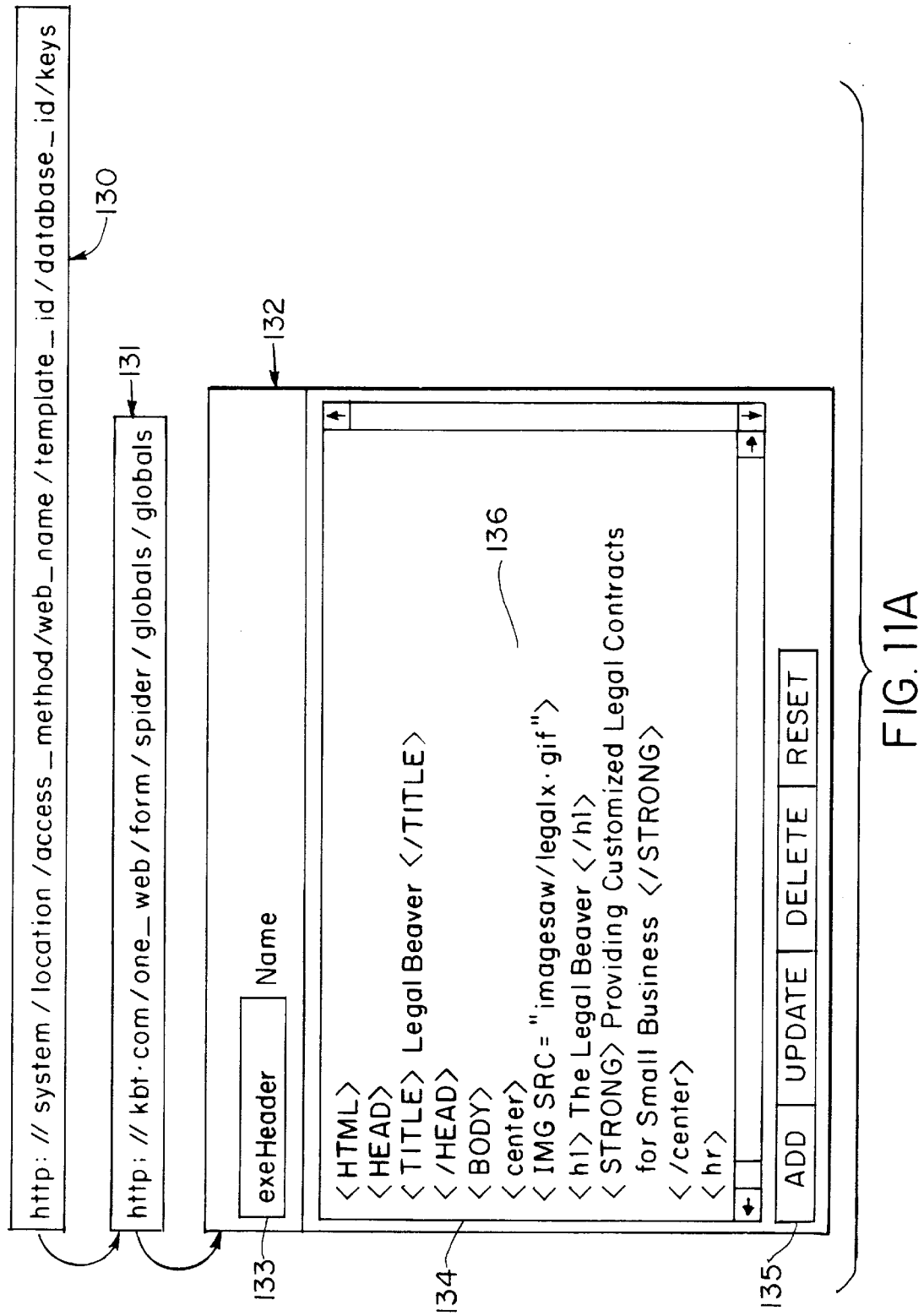

An example of a global header is shown in FIG. 11A. FIG. 11A shows that a preferred URL 130 for invoking a global template again involves identifying template and corresponding database ID's. As previously indicated, a URL 131 shown without file specification ("keys") invokes a blank template form 132 on a browser. FIG. 11A depicts a template having contents filled-out. A preferred global template includes two data fields 133, 134 and a set of action buttons 135, as previously described. In the name field 133, a name for the header template is specified. The source code is inserted in the text area 134. In FIG. 11A, the header source includes HTML text and a graphic file 136. FIG. 11B shows the resulting display page 137. As before, one of the ADD/ UPDATE/DELETE/RESET buttons is appropriately selected to transmit the finished template to the server.

Figure 11D:
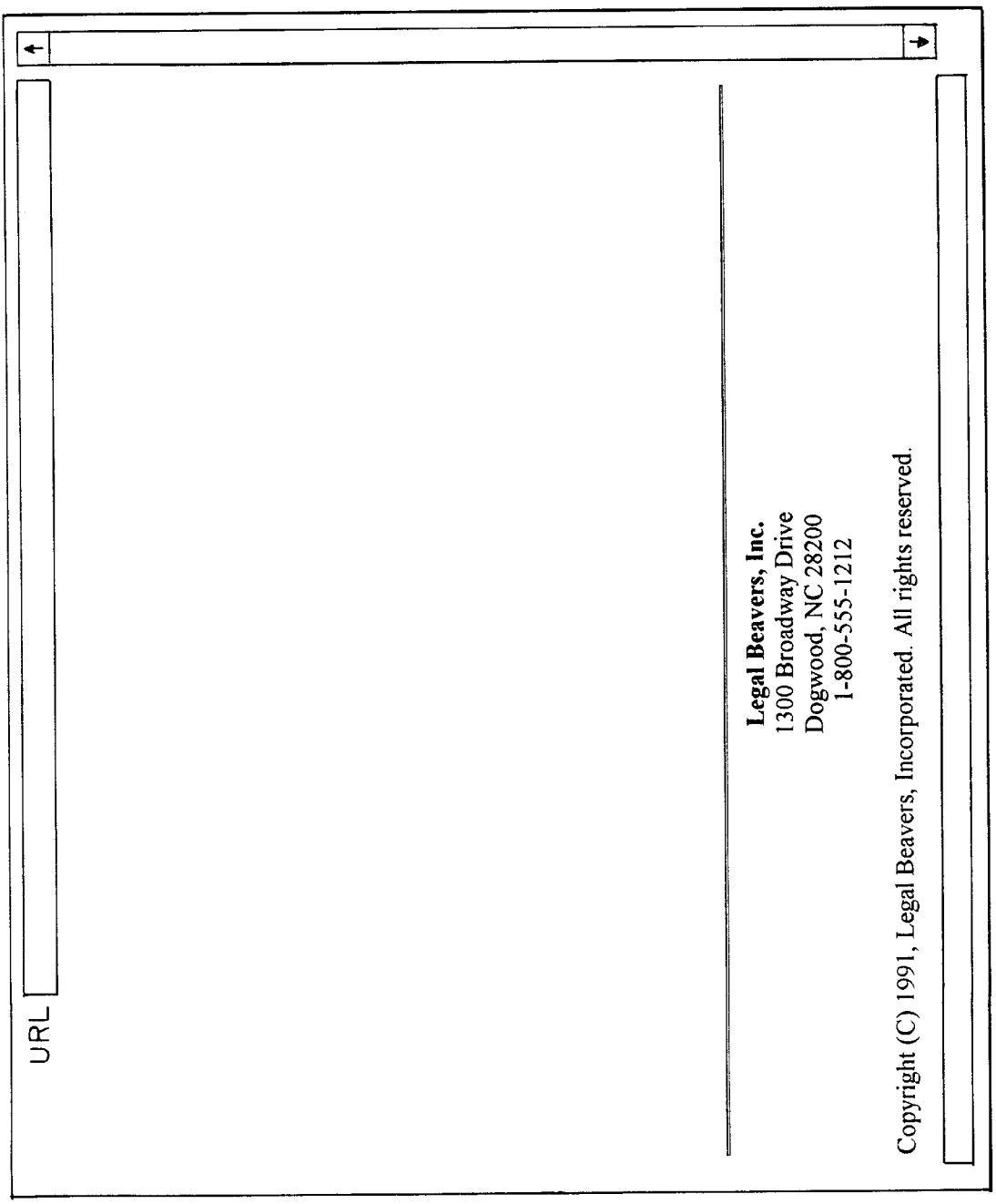

Similarly a global footer may be constructed. An example of a footer source and the corresponding display output are shown in FIGS. 11C and 11D, respectively.

A preferred technique for implementing globals in multiple templates of common application or a content provider is by embedding the tag extension, <#page> as previously demonstrated:

<#page/globals/exeHeader/html> for the header, and

<#page/globals/exeFooter/html> for the footer.
Upon execution, these tags are replaced with their respective values in "html" at the tag locations. An example in FIGS. 11E and 11F illustrate a source code using <#page> tags 138, 139 to implement header and footer in a business home page 138a.

Databases

Creating "databases" is another important aspect of the present invention. Databases themselves are yet another element of an application database. In a preferred embodiment, a database is also defined and maintained by a template/database structure. Database templates provide a platform to create new databases and to open existing databases to copy or modify the stored data values. The preferred syntax for URL is also maintained to retrieve individual database templates.

Figure 12A:
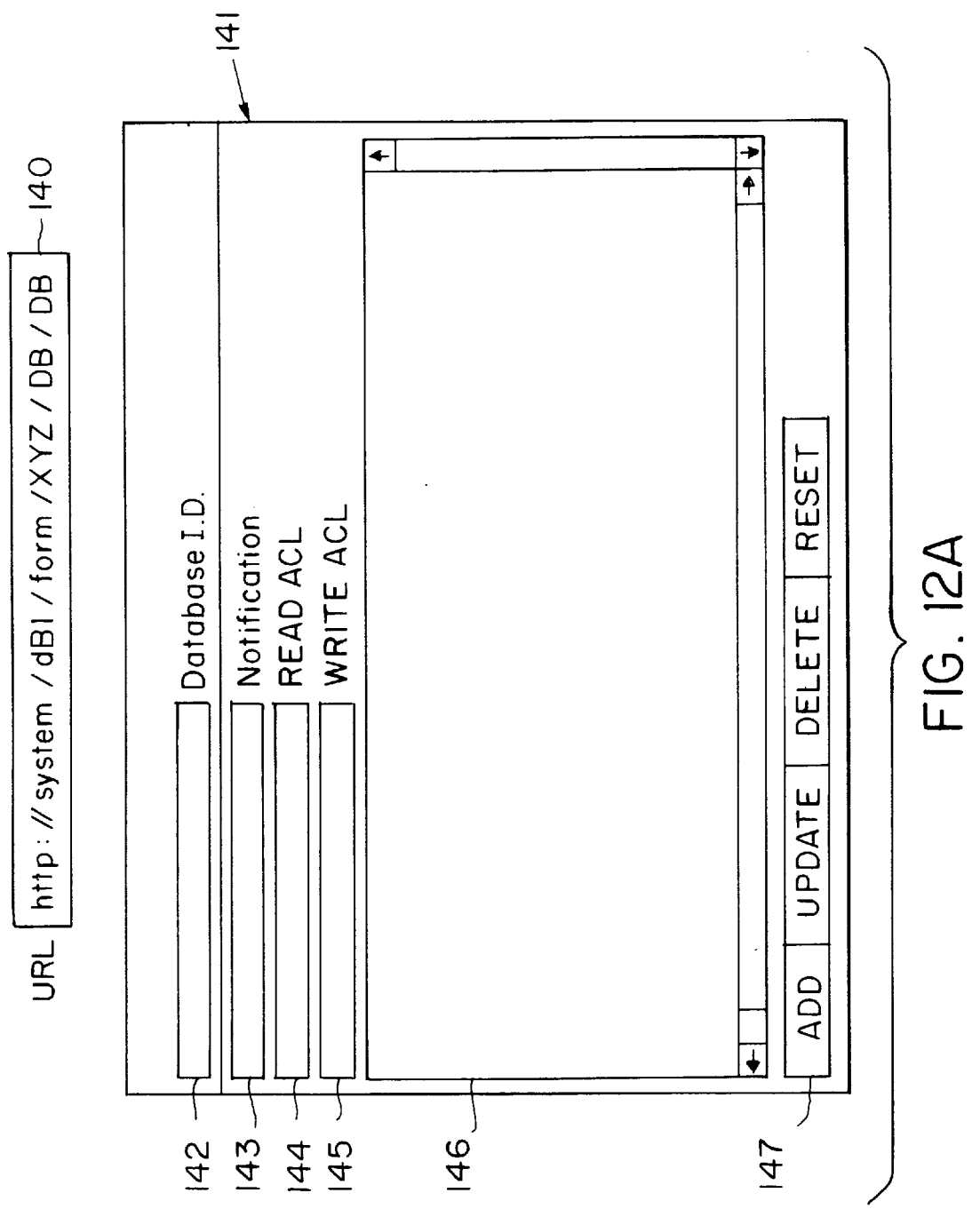
FIGS. 12A through 12C describe a preferred method of constructing a database template.

FIG. 12A illustrates a preferred method of defining the database fields. FIG. 12A describes the familiar process for invoking a blank template 141 with a particular URL form as given in 140. The preferred database template form 141 includes the notification field 143. This field lists names of users who will be notified if the database is changed. The text area 146 receives database definitions. The preferred database definitions include a "field name," "type field," and "data field."

Preferably, a "field name" begins with a "#" sign, and ends with either ".fld" for a normal field name, or ".key" for a unique field which can be randomly accessed.

The "type field" defines the type of data. The preferred field types include "text" and "text area."

The "data fields" vary depending on the type field. For the text type, the data fields include "description," "max length," and "size." For the text area type, the data fields include "description," "columns," and "rows."

A new database can be created by invoking a standard URL 140 call to a new template 141 as shown in FIG. 12A. A following example with the system parameters as provided below illustrates a new database ("ItemDB") 142 formation within using a template:

system=kbt.com
    location=one Web
    access method=form
    Web name=spider
    template i.d.=DB
    database i.d.=DB Hence, the access URL 140 for a new database template is:

http://kbt.com/one_Web/form/spider/DB/DB

In a blank database template 141, a user can insert a definition for a TEXT type field for a new database template as follows:

xxx.FLD or #xxx.KEY
    description=yyy
    max_length=nnn
    size=nnn
    type=TEXT In a preferred embodiment, "xxx" is a user-created name. It must be preceded immediately by a pound (#) sign, and followed by either a "FLD" or "KEY" extension, and the whole expression should not contain any spaces.

"yyy" is a string of text of one or more words that describe the field. It can contain spaces.

"nnn" are units that indicate the maximum length of the field and the field size.

Figure 12B:
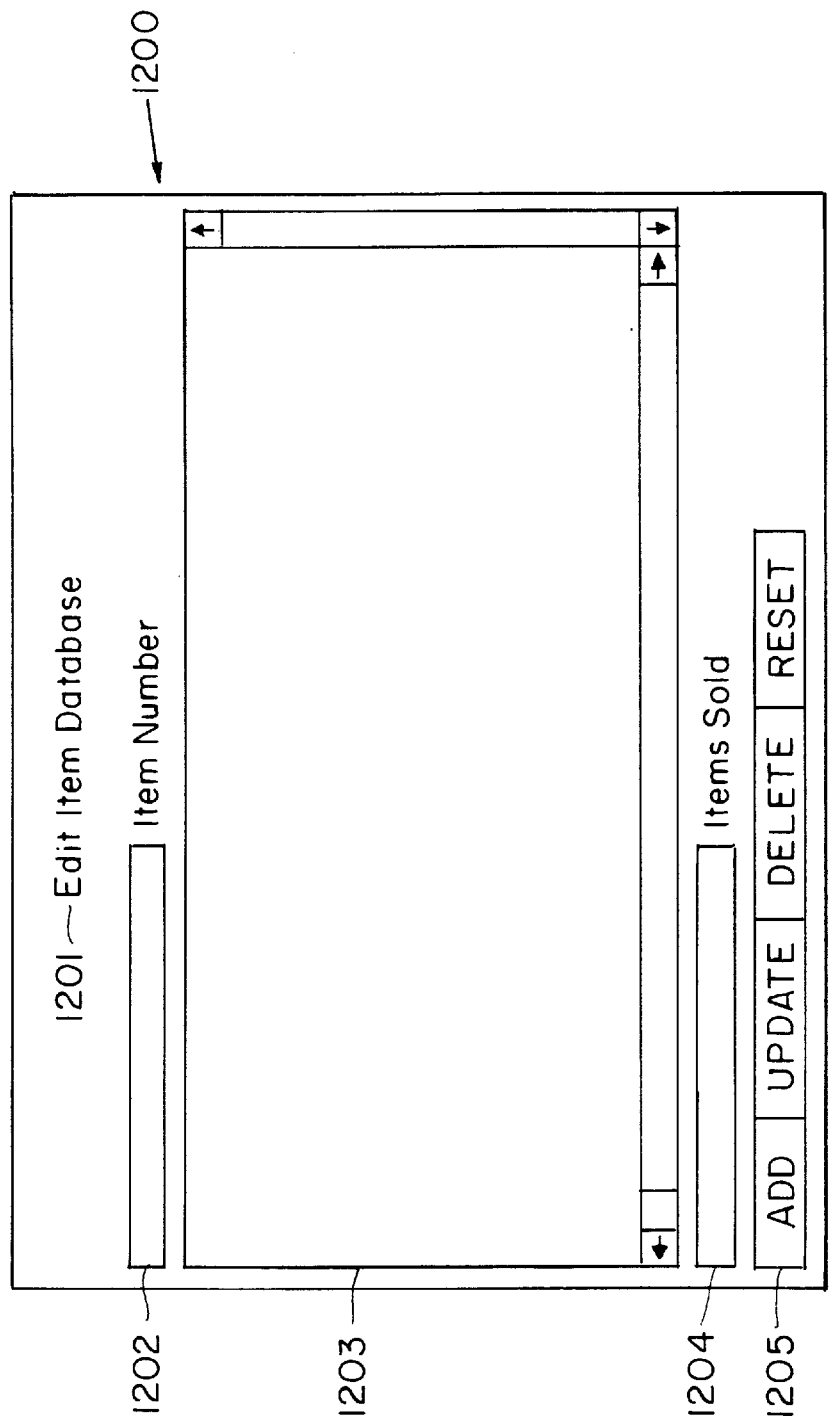

Similarly, a field definition for a TEXTAREA is:

xxx.FLD or #xxx.KEY
    description=yyy
    columns=nnn
    rows=nnn
    type=TEXTAREA Given the above parameters, a template having TEXT and TEXTAREA fields is created. For example, the following field definitions can be added to the textarea 146 to define a new template:

itemid.KEY
    description=Item Number
    max_length=20
    size=20
    type=TEXT
    #description.FLD
    description=Item Description
    columns=50
    rows=5
    type=TEXTAREA
    #totalsales.FLD
    description=Items Sold
    max_length=6
    size=6
    type=TEXT The definitions as given above are added to the database using an "Add" button in 147. The next step is to build a client interface (i.e., a template) which can add, modify, or delete items in the above database ("ItemDB"). For example, such a template is denoted as "EditDB", and is shown in FIG. 12B. The source for generating EditDB includes the following tags:

<h2>Edit Item Database</h2>
<#AWFORM>
<#itemid>
<#description>
<#totalsales>
<#UPDATEBUTTONS>
<#ENDFORM>

Note that each field or key name is called with a tag extension in the form "<#xxx>". Each extension, upon execution, is replaced with its defined value. FIG. 12B shows an output display page 1200 resulting from processing the above tags. In FIG. 12B, the <#itemid> tag produces a text field 1201 of a predefined length entitled "Item number." Similarly the <#description> tag produces a text area 1203 of predefined columns and rows, and the <#totalsales> tag produces yet another text field 1204 entitled "Items Sold."

The <#AWFORM> tag generates the code necessary to initialize an HTML <FORM> tag and sets both the access method and the action URL.

The <#UPDATEBUTTONS> tag initiates a script (i.e., a subroutine) that generates the [ADD][UPDATE][DELETE] [RESET] buttons at the bottom of the template.

The <#ENDFORM> tag creates the code necessary to close the HTML form and to update the "state" information, which will be discussed further below.

Figure 12C:
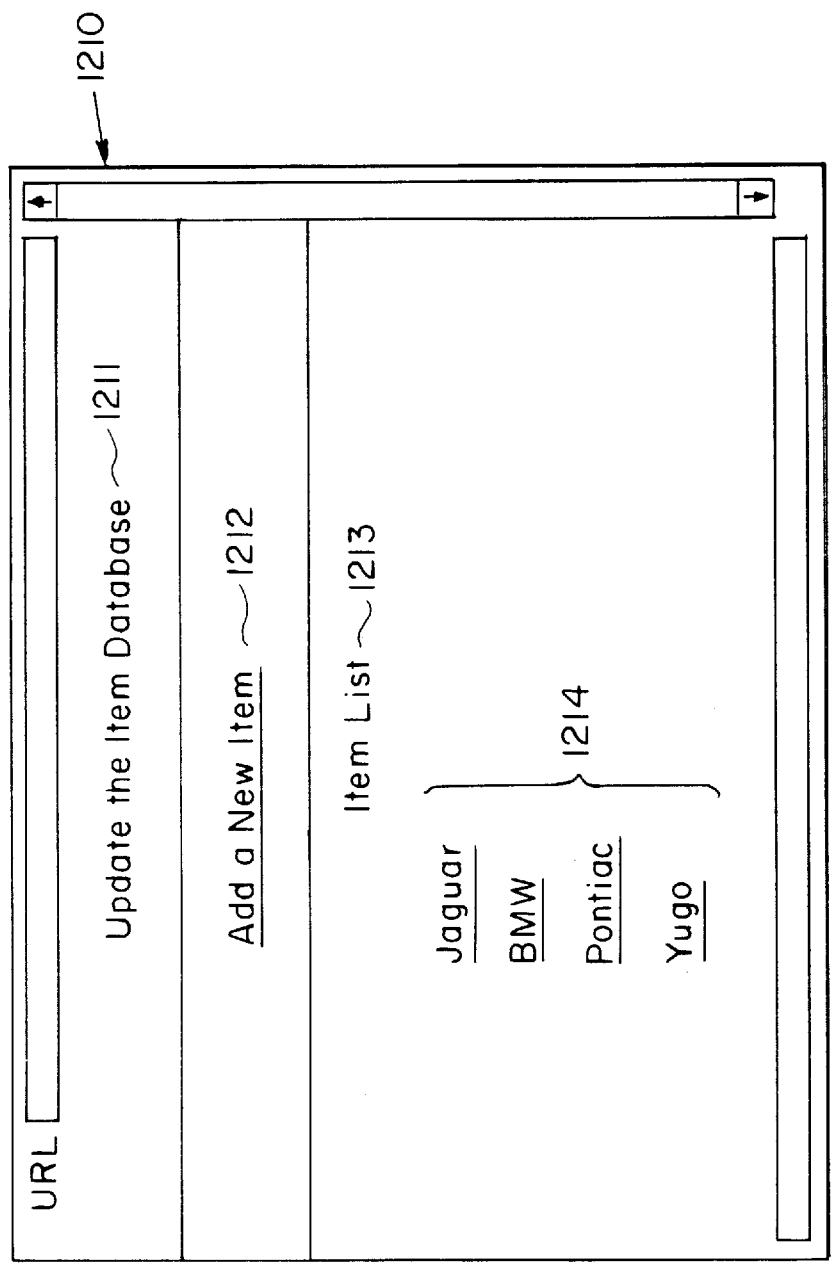

With the form as shown in FIG. 12B, a user can add items to the database "ItemDB" by inserting an item number, a description, and a sales status. As a final step, a top level user interface, a Web page, to invoke the template in FIG. 12B can be constructed. A user interface page, denoted as "exeUpdateDB," is shown in FIG. 12C and the corresponding source text is as follows:

<h2>Update the Item Database</h2>
<hr>
<A HREF="<#URLBASE>/form/<#web>/EditDB/ temDB">Add a New Item</A>
<#fordb ItemDB sort=name>
<hr>
<A HREF="<#URLBASE>/form/<#web>/EditDB/ ItemDB/<#page/ itemid>"><#page/description></A>
<#enddb>

By invoking the Web page "exeUpdateDB" 1210, the user is given a method to update and/or modify the "ItemDB" database. As shown in FIG. 12C, the "exeUpdateDB" page provides the user with an option to add a new item to the database 1212 or to update from a list of existing items 1214 in the database. Note that either of these options invokes the "exeEditDB" template 1200 in FIG. 12B, either as a blank form or with an existing item description.

The "exeEditDB" template 1200 can of course be directly obtained with the appropriate URL. The interface in FIG. 12C, however, makes use of an automated approach based on another important feature of the present invention. For example, as provided above, the existing items list 1214 is constructed with the following tag instructions pair of the present invention:

<#fordb dbase_id selection_criteria>statements
<#enddb>.

The <#fordb> instruction tag selects the set of data records by field name in a database with certain selection criteria. The "statements" between the tags are then executed once for each selected record. In the above example, as displayed in the page 1210 in FIG. 12C, <#fordb ItemDB sort=name> sets up a loop to select items in "ItemDB" database, and, for each item, a hypertext link 1214 is created using the item description as the link-text (i.e., via the tag <A HREF= "<#URLBASE>/form/<#Web>/EditDB /ItemDB/<#page/ itemid>"><#page/description></A>). In both URL constructions above, "EditDB" refers to the template i.d. and "ItemDB" is the database i.d. of the template/database pair structure of the preferred URL convention.

The example page 1210 in FIG. 12C allows any authorized user access to the template and database (i.e., "EditDB" and "ItemDB") to add or modify an application database.

Scripts

In a preferred embodiment, a "script" is a collection of extension tags and instruction sets executed in sequence to perform a prescribed task. For example, scripts update databases, perform calculations, set URL defaults by determining the next Web page to be displayed, add and collect state information. In a preferred embodiment, script codes are defined with templates with associated databases storing relevant values. In the preferred embodiment, script offers flexible integration into server applications. Preferred scripts can be tied to action buttons on an HTML display form or embedded in tags. Scripts can also expand tags, which in turn can invoke scripts.

Figure 13:
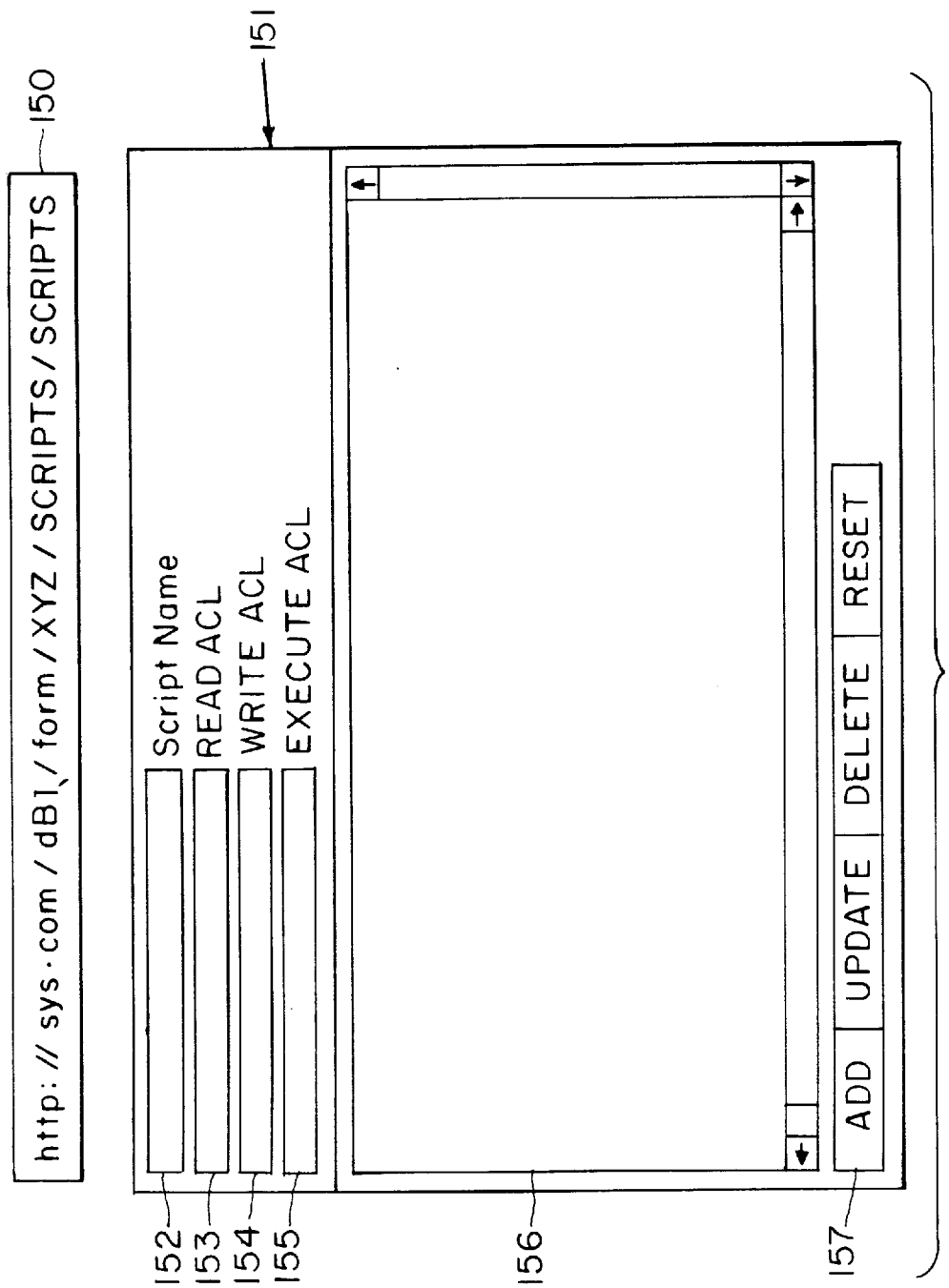
FIG. 13 describes a preferred method of constructing a script template.

FIG. 13A illustrates a blank script template 151 and the preferred URL 150. The template 151 includes the name field 152 and the access control fields 153, 154, and 155. The textarea 156 holds the script itself.

A preferred script includes one or more of the following instruction sets:

Get—the get instruction retrieves and extracts fields from a page, template, set, or database definition. The fields are then placed in a user-specified buffer which enables the processor to cycle through each field. The syntax is:

get[PAGE|TEMPLATE|SET|DB]id_name buffer_name

The "id_name" is the name of the page, template, set, or database and the "buffer_name" is a user-defined name designated for a buffer.

Put—The "put" instruction adds, updates or deletes a page, template, set, or database record stored in the specified buffer. The syntax is:

put[PAGE|TEMPLATE|SET|DB]buffer_name[Add|Update|Delete]

The "buffer_name" is typically the same buffer_name used in a previously executed "get" instruction.

If—The "if" instruction takes two arguments, a logical expression and a "label" directed to a location within the script text. Upon execution, the logical expression is evaluated, and if the expression is true, program flow jumps to the "label:" otherwise, the next statement following the "if" instruction is executed. The syntax is:

if [expression] Gohere
. . . statement 1
. . . statement 2
Gohere: statement 3

In the above example, the "if" expression is evaluated, and if true, the program will jump to execute "Gohere" and statement 3 at "Gohere:".

Goto—A goto instruction alters program flow and is frequently used with the "if" instruction. The syntax is:

```
if [expression] Gohere
    . . . statement 1
    . . . statement 2
    . . . goto There
    Gohere: statement 3
    There: statement 4
```

In this example, for false "expression," the "goto" instruction forces the program to skip statement 3, whereas in the previous example statement 3 would have been executed in either logical if "true" or "false."

Print—The "print" instruction takes one argument enclosed in quotes. Any tag within the quote is first evaluated and replaced before printing the string. For example, the <#LOCAL> tag is used to designate the value of any local variables, and <#page> is used to access external fields. An example is:

```
print "<br>Total items in Buffer sold:<#LOCAL/Buffer/sold>"
Qty=1
Qty=<#page/<#INPUT/data/>item/sold>+<#LOCAL/Qty>
print "<br>Total items sold before update: <#page/<#INPUT/data/>/item/sold>"
Buffer/sold=<#LOCAL/Qty>
print "<br>Total items sold after update:<#LOCAL/Qty>"
    The Result is:
    Total items in Buffer sold: 6
    Total items sold before update: 6
    Total items sold after update: 7
```

Note that, in this example, it is assumed that "Buffer" is the name of a user-defined input buffer for a "get" PAGE instruction and that "Qty" is a user-defined, temporary variable used to increment the total sold field. The <#LOCAL> tag is used to get the value of both the "Buffer/sold" and the "Qty" fields which are local to the script and the <#page> tag is used to get the value of the database field defined by <#INPUT/data>/item/sold> where <#INPUT/data> is the value of an input statement on the previous form. It is assumed that the value of the total sold "Buffer/sold" prior to the update was 6.

Set—The "set" instruction is used to designate the default template, database, or page specified by the appropriate keyword and the name of the template, database, or page to be invoked. The syntax is:

set template xyzPage

The above example sets the default URL to the Web page "xyzPage" and causes it to be displayed following the completion of script execution.

End—The "end" terminates the Script and returns control to the current default URL.

Putting the above instructions together, a script can be constructed to perform automatic purchase calculation in a series of Web page transactions. This example is shown in FIG. 13B. In FIG. 13B, the instruction get PAGE xyzContracts/<#INPUT/contract>conBuffer
    print "<br><h3>Thank you</h3> results in retrieving a page <#INPUT/contract>, which is a user selected page from the previous form. The fields within such a page is then extracted and stored in a user-defined buffer "conBuffer". If the user selected page equals ("eq") "NonCompete", then the program jumps to "nonc:" to print "Your Non Compete Form has been processed and." Otherwise, the script prints "Your Confidentiality Form has been processed and," and jumps to "next:". This location of the code represents a counter for counting the total items sold. Here again the <#LOCAL> tag is used to retrieve the values of "Qty" and "sold"; these values are combined to update the "sold" count. The put instruction updates the "cbiContracts" in accordance with the changed field contents in "conBuffer." Finally, upon completion of the script, the URL is set to display a template page called "exeTemplate4."

Server/Processor

Figure 14:
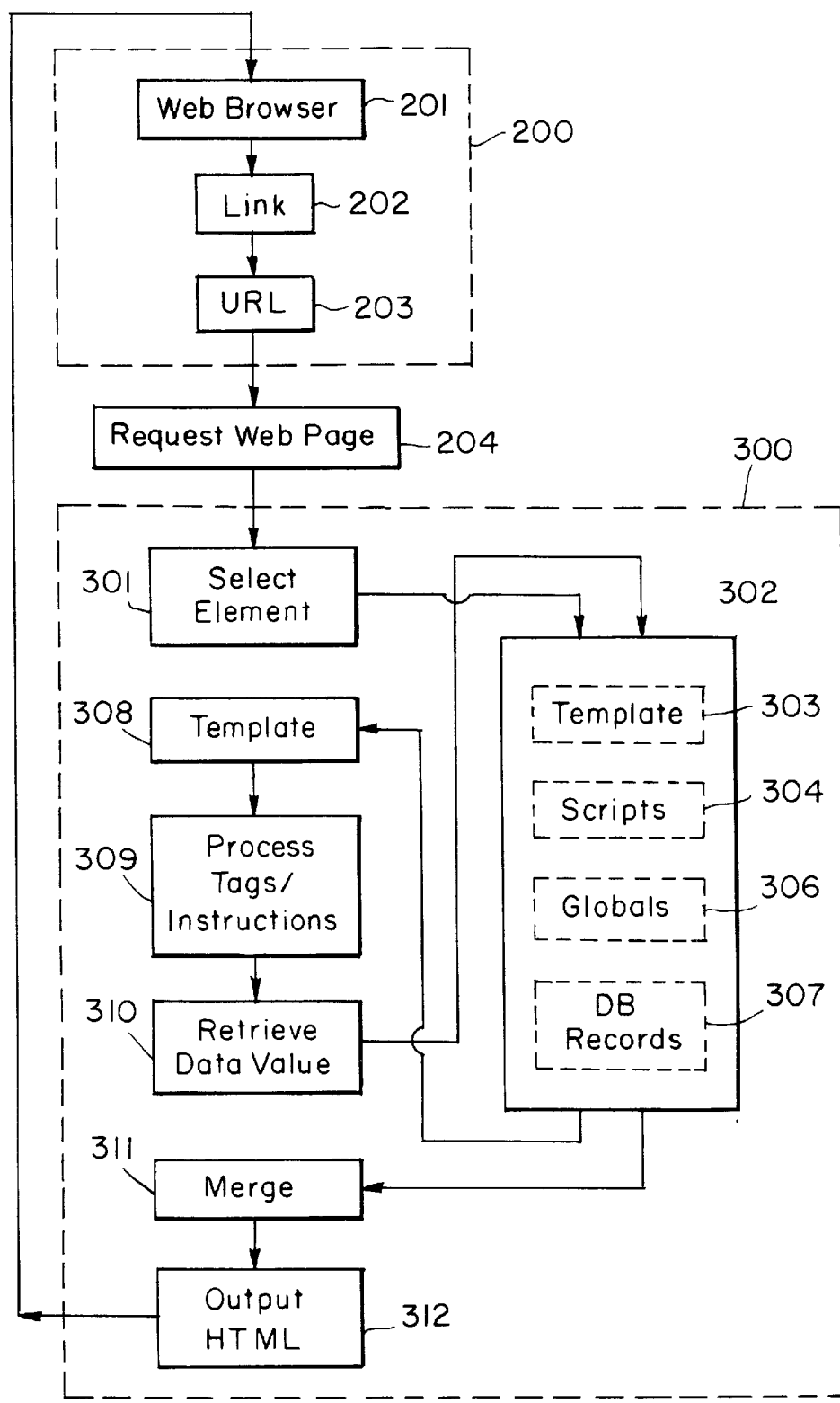
FIG. 14 is a flowchart description of a preferred client-server operation defined by the methods of the present invention.

The heart of present invention is a processor which controls a traditional HTTP server to execute templates featuring tag extensions, instructions and scripts of the present invention. FIG. 14 illustrates the preferred process flow of client/server interaction as controlled by the methods of the present invention. A user viewing a Web page through a Web browser 201 may select a hypertext link 202 directed to a URL 203 which results in a request of a Web page controlled by the server/processor ("server") 300 of the present invention. The URL defines the server location and directory path, the access method, and the name of a file stored by an application database 302 controlled by the server 300.

The server 300 processes the request 204 by identifying at 301 one of the application database elements to which the URL 203 is directed. A template 308 associated with the selected element is retrieved and processed by the server 300. In the preferred embodiment, this process involves executing embedded tag extensions or instructions 309. These tag elements are replaced with values retrieved from the database 302 until all tag extensions are exhausted and the template is left with only the HTML tags.

It is important to note that a tag extension of the present invention can point to other tags, instructions, or even other templates. An execution of a given tag extension involves full and complete expansion of all related tag extensions. Similarly the instruction tags and scripts are executed to perform related tasks and ultimately resolves in values readable by a conventional browser.

At 312 the server 300 prepares an output Web page containing HTML tags embedded with text corresponding to the merged data values. The output HTML page 312 is then transmitted to the client 200 for display. The browser 201 displays the output Web page in accordance with the HTML formatting codes.

Figure 15:
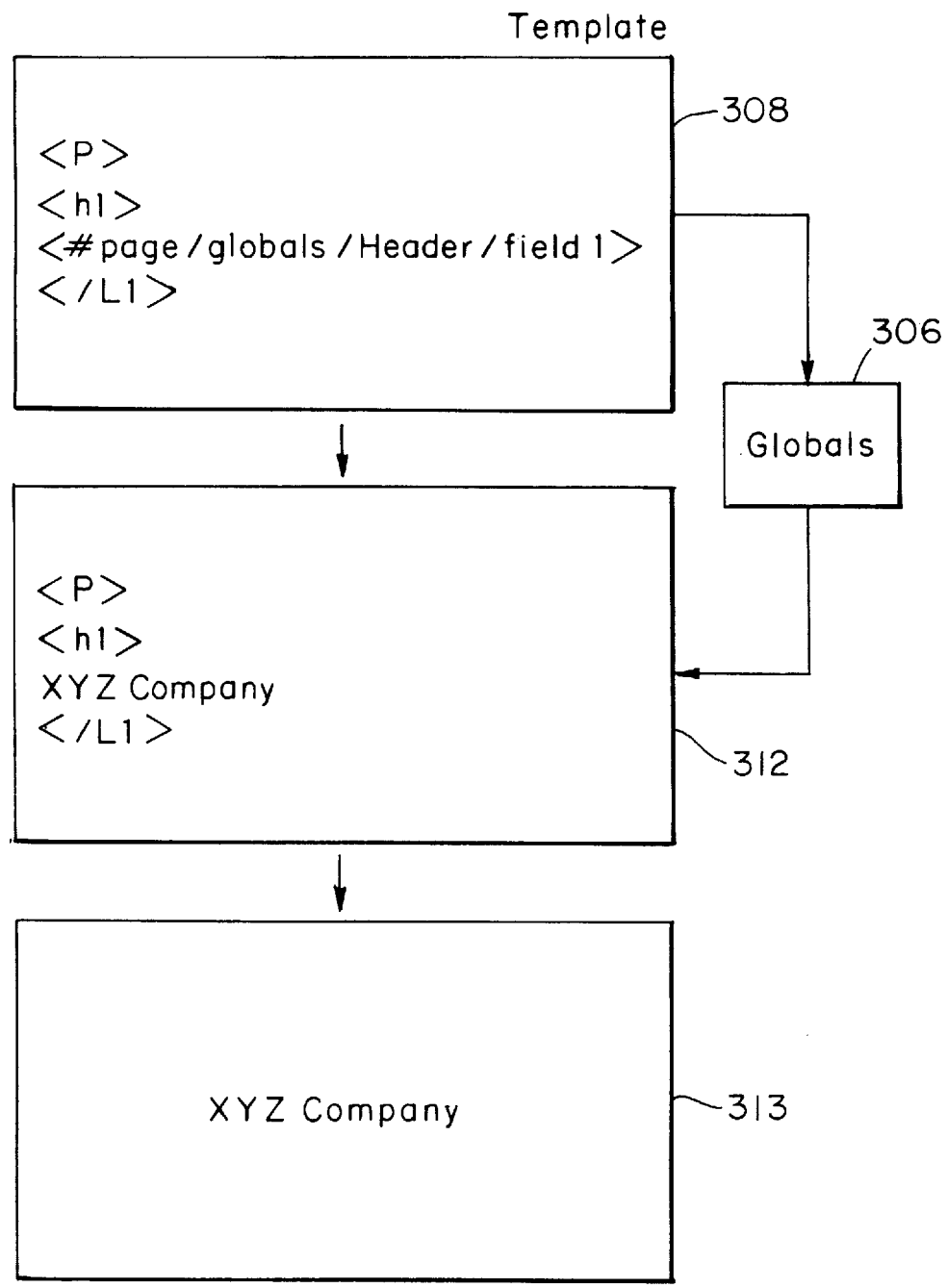
FIG. 15 illustrates how an HTML tag extension of the present invention works to insert a globals file within a Web page.

FIG. 15 further illustrates the tag replacement process by the server 300. FIG. 15 shows a portion of the template 308 which includes a <#page/globals/Header/field1> tag embedded within the conventional header tag pair <h1> and </h1>. At 312, the server 300 executes this tag extension by replacing the entire expression with the value in "field1", which is "XYZ Company". The result is an output HTML page 312 which includes the displayable header tag "<h1>XYZ Company</h1>". The browser decodes this tag and displays the text 313 as a header.

Access Control

Figure 16:
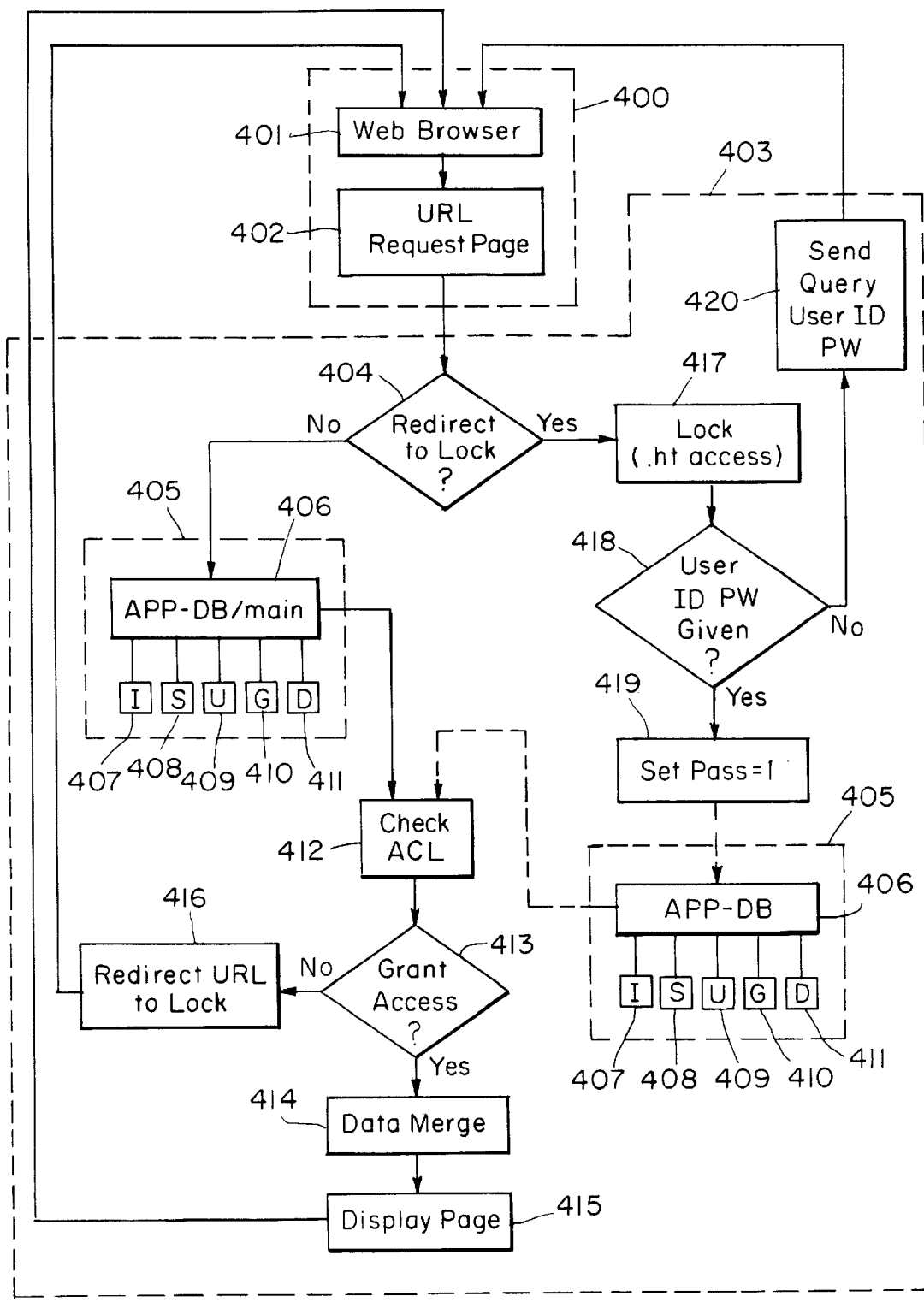
FIG. 16 is a flowchart description of a preferred security method of the present invention.

In a preferred embodiment, the present invention includes methods for controlling access to each application element. In the preferred embodiment, file protection at an element-level is achieved with the use of access control lists provided in each template. FIG. 16 illustrates a preferred process for controlling access to an application database element. For example, the process can trigger with a client 400 submitting a URL to a protected document through a Web browser 401. The server 403 processes the request at 404 to determine if the URL contains a "REDIRECT" to the "LOCK" directory 417 which is a special directory for verifying access by processing User ID's and Passwords, and setting subsequent passes to the content database within a given Web session. LOCK is a server specified directory, and, therefore, at the first URL request the "LOCK" directory would not be specified.

Upon establishing that no REDIRECT to the LOCK directory is specified in initial the URL, the server proceeds to retrieve a template to the requested page from the application database 406. At this stage, the server merely checks at 412 whether the template is access restricted to authorized users. Absence of a list in the access control fields grants access at 413 to everyone and the server proceeds to merge data 414 into the template to prepare the requested page for displaying 415 on the client Web browser 401.

In a preferred embodiment, if the records in the template are protected (i.e., restricted to a list users in the access control lists), the server denies access and sends a REDIRECT URL 416 to the "LOCK" directory to the client Web browser 401. The browser 401 automatically forwards the REDIRECT 416 for another processing by the server 403. At this time the server determines that the URL is a REDIRECT to the "LOCK" directory 417 and proceeds with an identification verification process.

The "LOCK" directory 417 includes an access profile (".htaccess"). In the preferred embodiment the profile provides information to the server as to whether or not the user has given a valid User ID and Password 418 in the present session. If the user has provided a valid User ID and Password 418, then the server sets a condition "Pass=1" 419 which allows the user to access any of the elements in the present application database 406 throughout the session. If the user has yet to provide a proper ID and Password server prepares and sends a query 420 back to the client browser 401 to request the user to input a proper User ID and Password.

A client response to the request for ID/Password is processed through an encrypted URL which includes the original document request and the path back to "LOCK" appended with the ID/Password information. Upon receiving the revised URL, the server first determines the validity of the ID/Password pair from the .htaccess profile. If the user is determined valid, the server 403 retrieves the template to the requested document and further determines whether the user is specified in the access control list. If the user is properly authorized, the server grants access to the record and begins processing the template to prepare an output display page 415.

States

Another important aspect of the present invention involves the process of building a state environment within a Web session. Normally, transactions on the Internet are stateless which renders a transfer of a particular Web page from a server to a client completely static. The relationship between the client and server is terminated upon delivery. Hence, the existing Internet servers normally cannot maintain the knowledge of what has occurred on a previous Web page or in a previous Web transaction.

Complex Web applications require, however, that the user and application communicate in a dialog across multiple Web pages. For example, in Internet shopping cart transactions, the user selects items to purchase, possibly over several Web pages, and then provide the application with the information necessary to complete the purchase, such as a credit card number and shipping address. But prior to completing a purchase, the user may wish to change purchase items by adding or deleting from the previous Web pages. In a stateless Web environment, a server cannot relate such changes to the original selection of items, and erroneously view each transaction as independent from the other.

The server/processor of the present invention, however, embeds state information in each Web page within a Web session such that each Web transaction can be identified and modified.

Figure 17:
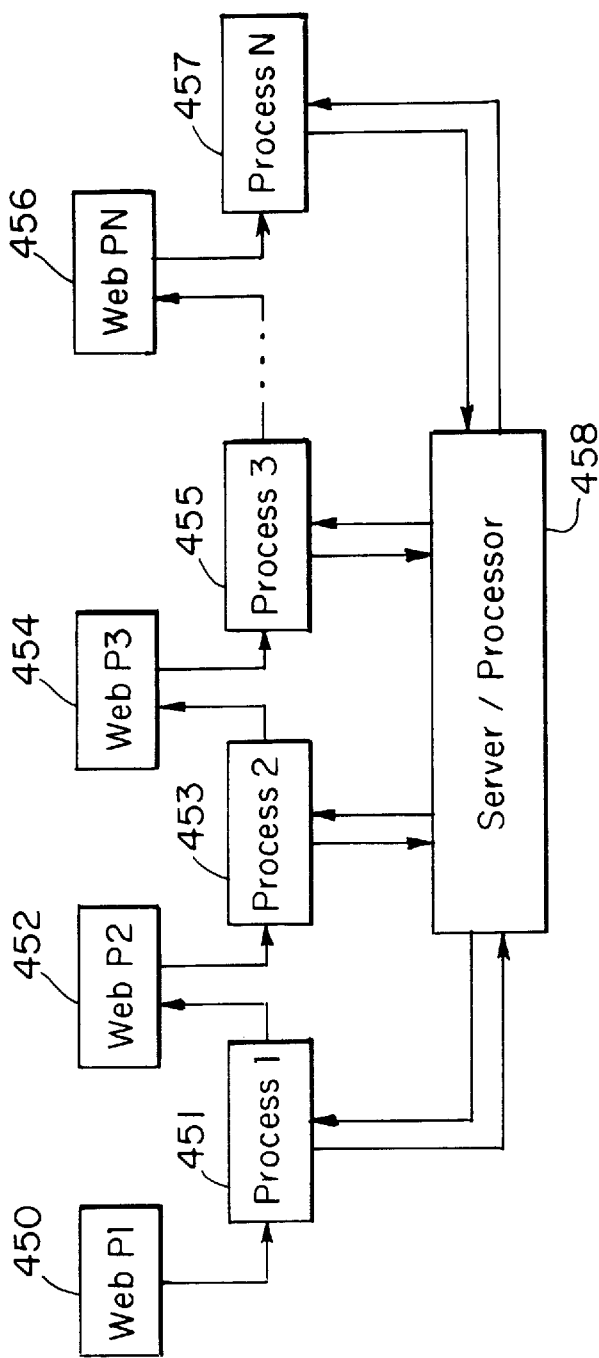
FIG. 17 illustrates a preferred method of constructing a state environment in a Web session in accordance with the methods of the present invention.
Figure 18:
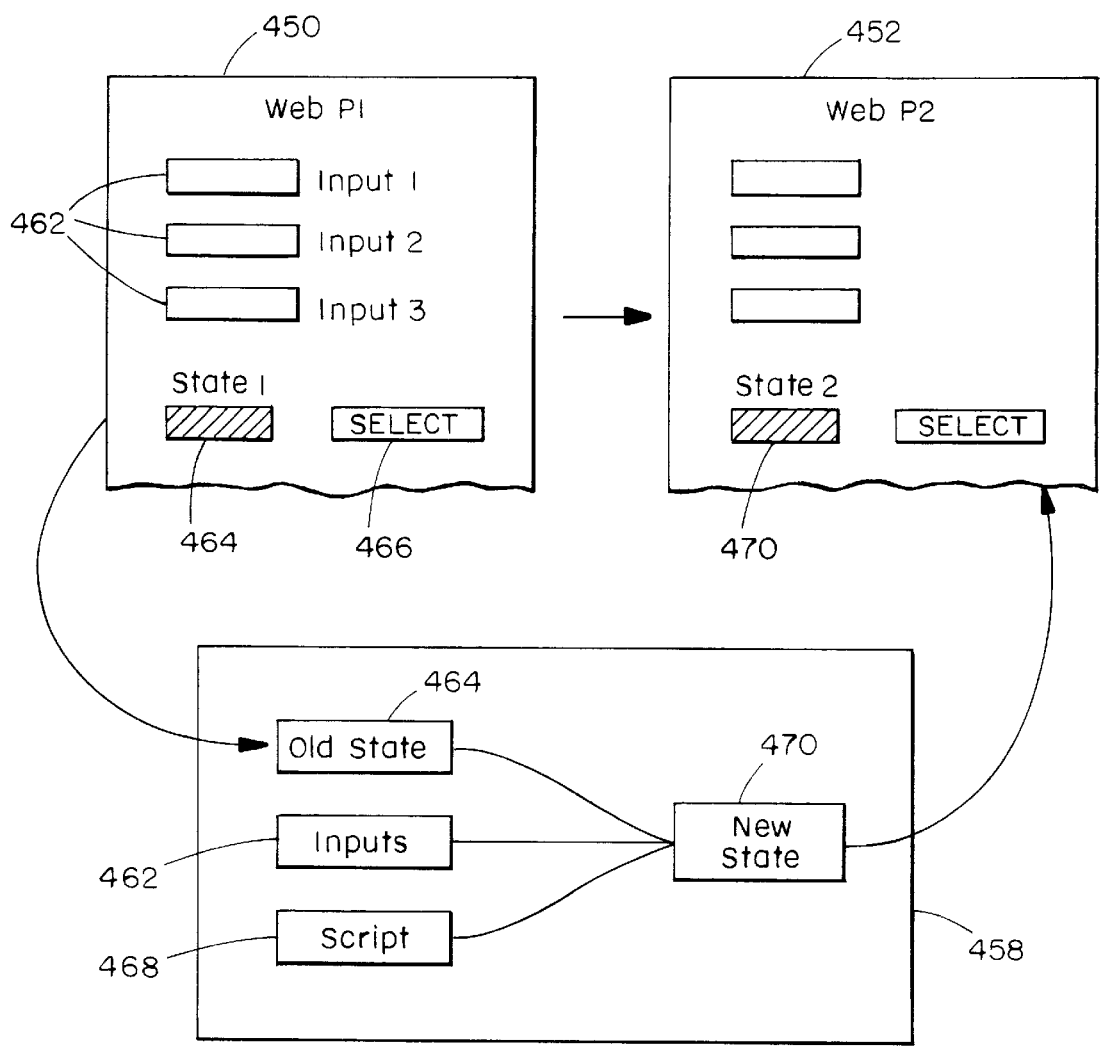
FIG. 18 illustrates a preferred state transfer method.

FIG. 17 describes a preferred method of building a state environment in a typical series of Web transactions in an Internet session. The need for maintaining a state environment generally arises in Web transactions involving user inputs, such as the Internet shopping scenario described above. User inputs may include information that user fills out in an HTML form or pages which subjects the user to any input actions (such as action buttons) while viewing a Web page. FIG. 17 is a preferred model of a series of client/server transactions beginning with the "Web P1" form 450. FIG. 18 describes the preferred state transfer method in which the Web forms are associated with templates of the present invention and includes a "state variable" 464, preferably hidden, and a call to a script 468 in a form of an action button, SELECT 466, for example.

On Web P1 450 the user, after selecting a choice of inputs 462, presses the SELECT button 466 to transmit the selections. In response, the server 458 processes the script 468 and generates a new state 470 based on the information gained from the old state variable 464, inputs 462 and script 468. The new state 470 is then embedded into a subsequent Web form 452. In the preferred embodiment, the resulting state variables are transmitted using a known network protocol or through the use of HTML hidden fields. Through each subsequent process (i.e., as shown in 453, 455, and 457), the state variable is accumulated and passed from one Web page to another. All the while, the server performs the normal task of accessing templates and processing the tag extensions for merging data records.

Instruction Set

The instruction set of the present invention can be used anywhere the extension tags are used. These instructions provide commands that can be used to read and write records and/or record definitions, create loops for extracting data from buffers, set up conditionals to control program flow, print messages, and create other constructions that simplify data retrieval and manipulation.

This section lists an exemplary set of instructions and describes how each work in the present invention.

•end

Related Key Word:next arguments:None

Syntax:end

The "end" instruction terminates execution of the script.

•forset

Related Key Word: endset, #SETURL, and #SETDESC

Argument1:set_name

Syntax:

forset set_name statements endset

The "forset" instruction causes all the statements between the keywords "forset" and "endset" to be executed once for each element in set_name. For each loop the tags <#SETURL> and <#SETDESC> retrieve the next value of the instruction tags #SETURLn and #SETDESCn. The loop terminates when "endset" exceeds the maximum number in the set database or detects no more elements in set.

•foreach
Related Key Word:next
Argument1:var_name
Argument2:buffer_name
Syntax:
foreach var_name buffer_name
statements...
next The "foreach" instruction causes all the statements between the keywords "foreach" and "next" to be executed once for each element in buffer_name. For each loop the var_name is set to the name of the element in buffer_name. The loop terminates when "next" detects no more elements in buffer_name.

•forget
Related Key Word: None
Argument: The #ScriptRESULTS tag or buffer_name/elements
Syntax:forget buffer_name The instruction "forget" clears the contents of the "print" and the "print buffer" (#ScriptRESULTS) or the contents of the entire buffer or a buffer element specified in Argument1.

•get
Related Key Word: None
Argument1:TEMPLATE|SET|DB|PAGE
Argument2:templ_id|set_id|db_id|page_id
Argument3:buffer name
Syntax:getdb_id buffer_name The "get" instruction extracts an actual record (in the case of PAGE) or gets the TEMPLATE, SET, or DB definition specified in Argument2 and reads it as though it were a record in the template, set, or database. The fields in that record are then put in the buffer specified in Argument3. This enables one to cycle through the field names one at a time.

•goto
Related Key Word: None
Argument1:label
Syntax:goto label
statements...
label:

The "goto" instruction causes program flow to be transferred to the "label" specified in the Argument1. Note that the label argument should not have a colon following the "label"; however, the label must be followed by a colon ":".

•if
Related Key Word: None
Argument1:an expression
Label:label_name
syntax:if expression label_name
statements
label_name The last item in an "if" instruction is a label (without a colon); everything else in between the "if" and the "label" is the expression that gets evaluated. Prior to being evaluated, any tag extensions in the expression are substituted. The resulting expression is then evaluated as True or False. If the expression is true, execution is transferred to the label specified in Argument2. If the expression is false, the next statement is executed. Note that there can be no double quotes in the expression.

•inbuffer
Related Key Word: None
Argument1:buffer_name
syntax:inbuffer buffer_name The "inbuffer" instruction takes everything on the input form and moves it to a local buffer that can be referenced by buffer_name.

•keys
Related Key Word: None
Argument1: [SET|DB]
Argument2: [set_id|db_id]
Argument3: buffer_name
Syntax:keys SET set_id buffer_name If Argument1 is DB, the "keys" instruction reads all of the keys for all of the records in the database identified by db_id in Argument2 and places the result in the buffer specified in Argument3 using the names key0, key1, key2, . . . keyn.

If Argument1 is SET, it reads all of the keys for all of the elements in the set specified by set_id.

•script
Related Key Word: None
Argument1:script_id
Syntax:script_id

The script instruction executes the script identified by script_id.

•print
Related Key Word: None
Argument1:a double quoted expression.
Syntax:print "string"

The "print" instruction takes an argument between two double quotes. Its first action is to replace any tag extensions with their value and then puts the result in the output buffer #ScriptRESULTS.

•printf
Related Key Word: None
Argument1: a double quoted expression
Argument2: tag, text, or constant
Syntax:printf "formatted string" tag The "printf" instruction takes two arguments. Argument1 is enclosed between two double quotes and contains field specifies; Argument2 can be one or more tag extensions, strings, text, and/or constants delineated by spaces. If spaces don't work single quotes (not double quotes) are used, i.e., 'sales program'. The contents of Argument2 is used by the processor to replace the field specifies in Argument1. The formatted output is put in the output buffer #ScriptRESULTS.

•put
Related Key Word: None
Argument1: [TEMPLATE|SET|DB|PAGE]
Argument2: buffer_name
Argument3: [Add|Update|Delete]
Syntax: put PAGE buffer_name Add The "put" instruction attempts to perform the specified action in Argument 3 (Add, Update, or Delete) with respect to the template, set, database, or page specified in Argument1 against the elements in the buffer specified in Argument2. It will return in #UPDLOG all of the actions taken to execute this script, and in #UPDRESULTS either the word 'Done' or the word 'Failed'. Note that the action keyword's first letter is uppercase.

•set

Related Key Word: None

Argument1: [template¦dbase¦page]

Argument2: [template_id¦dbase_id¦page_id]

Syntax: set template template_id

The "set" instruction identifies the current default template, database, or page as specified by the key word used in Argument1 with the name template_id, dbase_id, or page_id specified in Argument2.

•unpackfields

Related Key Word: None

Argument1: buffer_source

Argument2: buffer_destination

Syntax: unpackfields buffer_source buffer_destination

The "unpackfields" instructions for use on data definition records. This command transfers the definition in buffer_source to the buffer specified by Argument2. It translates all the field attributes in the data definition and puts in a field called field_attr.

Tag Extension Set

The tag extensions of the present invention are a set of HTML-like tags that extend the functionality of HTML, simplify the development of Web sites, and permit the implementation of an environment that retains information about previous transactions across the Web pages in a session.

The tag extensions simply get replaced by something. The key to understanding the tag extensions is, therefore, understanding what gets substituted in place of each tag.

The syntax of a tag extension is similar to an HTML tag in that both are enclosed in angle brackets "<>"; however, the tag extensions are preceded by a pound sign "#". Like HTML tags, the tag extensions may also have one or more modifiers.

Example: <#tag modifier1 modifier2>

The following is a list of exemplary tag extensions, modifiers if applicable, and an explanation of the substitution that occurs through processing:

AWFORM

Syntax: <#AWFORM>

Generates the syntax necessary to initialize an HTML form including setting the HTML<FORM> tag with METHOD equal to 'POST' and ACTION to the default URL.

ENDFORM

Syntax: <#ENDFORM>

Creates the code necessary to terminate an HTML form including the State information to be carried forward to the next Web page.

fordb

Syntax:

<#fordb database_id field_id sort_method (A¦D)selection_criteria max_records> statements to be executed

<#enddb>

Selects the set of records in "dbase_id", sorts them by field_name, in A (ascending) or D (descending) order, using the selection_criteria, and limits the selection to max_records. The statements between #fordb and #enddb are then executed once for each record in the "dbase_id" set.

LOCAL

Syntax: <LOCAL/variable_id>

The value of a local variable. Local variables on the right side of an assignment statement must use #LOCAL to retrieve the value of that variable. Local variables on the left side of an assignment do not use #LOCAL. (It is implied and will produce an error.) The #LOCAL tag is also used to retrieve the value of something that was originally a script variable.

Script

Syntax: <#script/script_id>

Executes the script referenced by script_id and is replaced by that results.

ScriptBUTTON

Syntax: <#ScriptBUTTON script_id script_mod text_string image_id>

The #ScriptBUTTON tag creates a three-dimensional button which has the text specified in "text_string" or the name of the script_id (if no "text_string") and executes the script, "script_id". The "script_mod" is passed to the script, "script_id", and can be referenced as with the key word ScriptMOD.

ScriptRESULTS

Syntax: <#ScriptRESULTS>

Replaced by all the print statements of the previous script.

page

Syntax: <#page database_id/name_id/field_id>

The #page tag extracts the data in the database, database_id, record, name_id, and field_id.

SETDESC

Syntax: <#SETDESC=url_description>

Sets the description of the URL described by the instruction #SETDESCn in a user-defined SET.

SETURL

Syntax: <#SETURL=url>

Sets the url described by the instruction #SETURLn in a user-defined SET.

TIMENOW

Syntax: <#TIMENOW>

Substitutes the current time in 'hour:minutes:seconds' format.

TODAY

Syntax: <#TODAY>

Substitutes today's date in 'month/day/year' format.

TYPE

Syntax: <#TYPE>

Substitutes the default access method, i.e., 'form', 'update', etc.

USER

Syntax: <#USER>

Replaced by the logged-in user name.

UPDATEBUTTONS

Syntax: <#UPDATEBUTTONS>

Generates the code necessary to insert the Add/Update/Delete/Reset buttons.

UPD_RESULTS

Syntax: <#UPD_RESULTS>

This is either 'done' or 'failed' based upon the results of the Update action.

UPD_URL

Syntax: <#UPD_URL=url>

Replaced by the entry URL when processing a form on an Add or Update.

UPD_LOG

Syntax: <#UPD_LOG>

A log of what occurred when an Add, Update, or Delete was processed.

URLBASE

Syntax: <#URLBASE>

Returns the part of the URL which is the present system/location.

Web
Syntax: <#Web>
 Return the present Web name.

Equivalents

Those skilled in the art will know, or be able to ascertain using no more than routine experimentation, many equivalents to the specific embodiments or the invention described herein. These and all other equivalents are intended to be encompassed by the following claims.

I claim:

1. A method of deploying client-server applications on a network comprising:
 inserting executable tags in a hypertext source to a displayable page;
 in response to a request for the displayable page from a client to a server, retrieving the hypertext source and, prior to forwarding the hypertext source to the client, processing the source at the server by executing the tags; and
 forwarding the hypertext source processed at the server to the client.

2. A method as claimed in claim 1 wherein each of the executable tags identifies from a database a value such that executing the executable tags replaces each tag with the corresponding value.

3. A method as claimed in claim 2 wherein the value is identified by a field name and the database stores field name/value pairs.

4. A method as claimed in claim 1 further comprising:
 providing a hypertext form including a text area containing the source;
 accessing the form through a client browser; and
 revising the hypertext source in the text area of the form through the client browser.

5. A method as claimed in claim 4 wherein the form further includes an input field for entering an access control list to specify authorized users of the form.

6. A method as claimed in claim 4 wherein the source is remotely entered into the form through electronic mail.

7. A method as claimed in claim 4 wherein the form further includes an identification field for entering a form identification.

8. A method as claimed in claim 4 wherein the hypertext source includes the executable tags, each executable tag identifying from a database a value which is directed to another hypertext form.

9. A method as claimed in claim 1 wherein the source includes markup codes and the executable tags are embedded within the markup codes.

10. A method as claimed in claim 1 wherein the executable tags are executed by the server.

11. A method as claimed in claim 1 wherein the executable tags include instructions to cause the server to perform predefined functions.

12. A method as claimed in claim 11 wherein the instructions include a control-loop function to collect data from a group of data sources in a predefined manner.

13. A method as claimed in claim 1 wherein the source includes executable scripts each including a series of other executable tags to perform predefined tasks.

14. A method as claimed in claim 13 wherein the executable tags point to the scripts such that executing the executable tag causes the script to expand and further execute the other executable tags arranged within the script.

15. A method as claimed in claim 13 wherein the executable tag identifies from a database a value which includes the script such that executing the executable tag causes the script to expand and exhaustively execute the other executable tags arranged within the script until a final one of the other executable tags is executed to replace the executable tag in the hypertext source with a resulting data.

16. A method as claimed in claim 2 wherein the value includes instructions.

17. A method as claimed in claim 2 wherein the database is controlled by the server.

18. A method as claimed in claim 2 wherein the value is alphanumeric text.

19. A method as claimed in claim 2 wherein the value is a uniform resource locator.

20. A method as claimed in claim 2 wherein the value is a new executable tag.

21. A method as claimed in claim 1 wherein the client-server applications are World Wide Web applications and the network is the Internet.

22. A method as claimed in claim 1 wherein the client and server communicate through hypertext transfer protocol.

23. A method of implementing client-server applications for deployment over a network comprising:
 preparing a template to a hypertext source of a displayable page for processing by a server, the template comprising:
  a text area for containing source codes which includes executable tags embedded within hypertext codes, each executable tag specifying from a database a value such that executing the executable tags replaces each executable tag with the corresponding value, and renders the source codes to include only the values embedded within the hypertext codes;
  an identification field for entering a template identification; and
  an input field for entering an access control list to specify authorized users of the template;
 retrieving the template in response to a client request from a client browser to the server for the page;
 processing the source code in the text area, at the server, by executing the executable tags to replace each executable tag with the corresponding value to produce the hypertext source of the page; and
 transmitting the source to the browser for displaying the page.

24. A method of claim 23 wherein the network is the Internet.

25. A system for deploying client-server applications on a network comprising:
 at a server, executable tags in a hypertext source to a displayable page; and
 at the server, a process for processing the source in response to a request for the page from a client to the server, the process executing the executable tags prior to forwarding of the page to the client;
 wherein each of the executable tags identifies from a database a value such that executing the executable tags replaces each executable tag with the corresponding value;
 a hypertext form including a text area for containing the source, the form being accessible through a client browser for revising the source in the text area of the form through the browser;
 wherein the form further includes an input field for entering an access control list to specify authorized users of the form; and
 wherein the source includes the executable tags, each executable tag identifying from a database a value which is directed to another hypertext form.

26. A system for deploying client-server applications on a network comprising:

at a server, executable tags in a hypertext source to a displayable page; and at the server, a process for processing the source in response to a request for the page from a client to the server, the process executing the executable tags prior to forwarding of the page to the client;

wherein each of the executable tags identifies from a database a value such that executing the executable tags replaces each executable tag with the corresponding value; and wherein the source includes hypertext markup codes and the executable tags are embedded within the codes.

27. A system for implementing network applications for deployment over a network comprising:

a template to a hypertext source of a displayable page, the template comprising:

a text area for containing source codes which includes executable tags embedded within hypertext codes, each tag specifying from a database a value such that executing the tags replaces each tag with the corresponding value, and renders the source codes to include only the values embedded within the hypertext codes;

an identification field for entering a template identification; and an input field for entering an access control list to specify authorized users of the template; and a server for retrieving the template in response to a request for the page from a client browser, the server processing the source code in the text area by executing the tags to replace each tag with the corresponding value to produce the hypertext source of the page, and transmitting the source to the browser for displaying the page.

28. A method for managing web page contents of a world wide web site served by a server without having to repetitively edit web page sources, comprising the steps of:

inserting executable tags in a hypertext source to a displayable web page;

maintaining a database including data and objects referenced by the executable tags;

prior to forwarding the displayable web page to a client from the server, retrieving the hypertext source and, processing the source at the server by executing the tags to incorporate the data and objects referenced by the executable tags within the database into the hypertext source; and forwarding the hypertext source processed at the server to the client.

* * * * *